US007363365B2

(12) United States Patent
Ocko et al.

(10) Patent No.: US 7,363,365 B2
(45) Date of Patent: Apr. 22, 2008

(54) AUTONOMOUS SERVICE BACKUP AND MIGRATION

(75) Inventors: Matt Ocko, Palo Alto, CA (US);
George Tuma, Scotts Valley, CA (US);
Manish Kalia, Sunnyvale, CA (US);
Sandeep Sukhija, Milpitas, CA (US);
John Purrier, Seattle, WA (US);
Rajesh Gupta, Sunnyvale, CA (US);
Saumitra Das, Santa Clara, CA (US)

(73) Assignee: Teneros Inc., Mountain View, CA (US)

( * ) Notice: Subject to any disclaimer, the term of this patent is extended or adjusted under 35 U.S.C. 154(b) by 522 days.

(21) Appl. No.: 11/166,043

(22) Filed: Jun. 24, 2005

(65) Prior Publication Data
US 2006/0015641 A1 Jan. 19, 2006

Related U.S. Application Data

(60) Provisional application No. 60/587,786, filed on Jul. 13, 2004.

(51) Int. Cl.
*G06F 15/173* (2006.01)
(52) U.S. Cl. ...................................... 709/223; 709/238
(58) Field of Classification Search ................ 709/223, 709/224, 225, 238; 714/4, 13, 12
See application file for complete search history.

(56) References Cited

U.S. PATENT DOCUMENTS

| 5,978,565 | A | 11/1999 | Ohran et al. |
| 6,324,654 | B1 | 11/2001 | Wahl et al. |
| 6,442,706 | B1 | 8/2002 | Wahl et al. |
| 6,519,552 | B1 | 2/2003 | Sampath et al. |
| 6,560,614 | B1 | 5/2003 | Barboy et al. |
| 6,560,617 | B1 | 5/2003 | Winger et al. |
| 6,618,818 | B1 | 9/2003 | Wahl et al. |
| 6,711,572 | B2 | 3/2004 | Zakharov et al. |
| 2002/0059245 | A1 | 5/2002 | Zakharov et al. |
| 2002/0133612 | A1 | 9/2002 | Depelteau |
| 2003/0101321 | A1 | 5/2003 | Ohran |

(Continued)

FOREIGN PATENT DOCUMENTS

CN 1498375 A 5/2004

(Continued)

*Primary Examiner*—Larry D. Donaghue
(74) *Attorney, Agent, or Firm*—Philip H. Albert; Townsend and Townsend and Crew LLP

(57) ABSTRACT

A service appliance is installed between a production server running a service applications and service users. Upon being connected with the production server, the service appliance contacts the production server and/or service application and automatically replicates the service data from the service application. As additional service data is added to or modified by the service application of the production server, the service appliance automatically updates its replica of the data. In the event that a production server is unable to provide its service to users, the service appliance can transparently intervene to maintain service availability using the replica of the data. When an operational production server is connected with the service appliance, the service appliance can automatically copy its service data to the service application of the operational production server. The operational production server can be the same as the original production server or a new production server.

14 Claims, 14 Drawing Sheets

U.S. PATENT DOCUMENTS

| | | |
|---|---|---|
| 2003/0163755 A1 | 8/2003 | Fung et al. |
| 2004/0103211 A1 | 5/2004 | Jackson et al. |
| 2004/0153823 A1 | 8/2004 | Ansari |
| 2004/0154313 A1 | 8/2004 | Taylor et al. |
| 2004/0172574 A1 | 9/2004 | Wing et al. |
| 2004/0243651 A1 | 12/2004 | Kast et al. |
| 2004/0267897 A1 | 12/2004 | Hill et al. |
| 2005/0132030 A1* | 6/2005 | Hopen et al. ............... 709/223 |
| 2005/0160312 A1 | 7/2005 | Seng et al. |
| 2005/0251540 A1 | 11/2005 | Sim-Tang |
| 2005/0262097 A1 | 11/2005 | Sim-Tang et al. |
| 2005/0262377 A1 | 11/2005 | Sim-Tang |
| 2006/0020671 A1 | 1/2006 | Pike et al. |

FOREIGN PATENT DOCUMENTS

| | | |
|---|---|---|
| CN | 1596400 A | 3/2005 |
| JP | 05/512191 A | 4/2005 |
| WO | WO 01/97071 A2 | 12/2001 |
| WO | WO 03/075571 A1 | 9/2002 |
| WO | WO 02/081360 A1 | 10/2002 |
| WO | WO 02/097624 A2 | 12/2002 |
| WO | WO 03/048941 A1 | 6/2003 |
| WO | WO 03/073688 A1 | 9/2003 |
| WO | WO 03/081430 A2 | 10/2003 |
| WO | WO 2004/107637 A2 | 12/2004 |
| WO | WO 2005/023028 A1 | 3/2005 |
| WO | WO 2005/099411 A2 | 10/2005 |
| WO | WO 2005/111051 A1 | 11/2005 |
| WO | WO 2005/111788 A2 | 11/2005 |
| WO | WO 2005/111870 A2 | 11/2005 |

* cited by examiner

AUTONOMOUS SERVICE BACKUP AND MIGRATION

CROSS-REFERENCES TO RELATED APPLICATIONS

This application claims benefit under 35 U.S.C. 119(e) of U.S. Provisional Patent Application No. 60/587,786, filed Jul. 13, 2004, which is herein incorporated by reference in its entirety for all purpose. This application is related to U.S. patent applications Ser. No. 11/166,334 filed Jun. 24, 2005, Ser. No. 11/165,837, filed Jun. 24, 2005 and Ser. No. 11/166,359 filed Jun. 24, 2005, the disclosures of which are incorporated by reference herein for all purposes.

BACKGROUND OF THE INVENTION

Organizations and business enterprises typically have one or more core service applications that are vital to their operations. For example, many organizations rely on e-mail, contact management, calendaring, and electronic collaboration services provided by one or more service applications. In another example, a database and associated applications can provide the core operations used by the organization. These core services are critical to the normal operation of the organization. During periods of service interruption, referred to as service downtime, organizations may be forced to stop or substantially curtail their activities. Thus, service downtime can substantially increase an organization's costs and reduce its efficiency.

A number of different sources can cause service downtime. Critical services may be dependent on other critical or non-critical services to function. A failure in another service can cause the critical service application to fail. For example, e-mail service applications are often dependent on directory services, such as Active Directory, one configuration of which is called Global Catalog, to function. Additionally, service enhancement applications, such as spam message filters and anti-virus applications, can malfunction and disable a critical service application.

Another source of service downtime is administrative errors. Service administrators might update critical service applications with poorly tested software updates, or patches, that cause the critical service application to fail. Additionally, some service applications require frequent updates to correct for newly discovered security holes and critical flaws. Installing the plethora of patches for these service applications in the wrong order can cause the service application to fail. Additionally, service administrators may misconfigure service applications or issue erroneous or malicious commands, causing service downtime.

Application data is another source of service downtime. Databases used by critical service applications can fail. Additionally, service application data can be corrupted, either accidentally or intentionally by computer viruses and worms. These can lead to service downtime.

Software and hardware issues can also lead to service downtime. Flaws in the critical service application and its underlying operating system, such as memory leaks and other software bugs, can cause the service applications to fail. Additionally, the hardware supporting the service application can fail. For example, processors, power and cooling systems, circuit boards, network interfaces, and storage devices can malfunction, causing service downtime.

Reducing or eliminating service downtime for an organization's critical services can be expensive and complicated. Because of the large number of sources of service downtime, there is often no single solution to minimize service downtime. Adding redundancy to service applications, such as backup and clustering systems, is expensive and/or complicated to configure and maintain, and often fails to prevent some types of service downtime. For example, if a defective software update is installed on one service application in a clustered system, the defect will be mirrored on all of the other service applications in the clustered system. As a result, all of the service applications in the system will fail and the service will be interrupted. Similarly, administrator errors will affect all of the service applications in a clustered system equally, again resulting in service downtime.

It is therefore desirable for a system to reduce service downtime from a variety of sources. It is further desirable that the system operate transparently so that the configuration and operation of the service application is unchanged from its original condition. It is also desirable that the system detects the service application failure or imminent failure and to seamlessly take over the service so that service users cannot perceive any interruption in service during the period that the service application is not functioning, referred to as a "failover" period. It is desirable that the system detects when a failed service application is restored to normal operation, to update the service application with data handled by the system during the service application downtime, and to seamlessly return the control of the service to the service application so that service users cannot perceive any interruption in service during this "failback" period. It is desirable that the system require minimal configuration and installation from service administrators. It is also desirable that the system be robust against failure, self-monitoring and self-repairing, and be capable of automatically updating itself when needed.

Additionally, it is desirable for the system to allow for services to be migrated to new service applications and/or hardware without service users perceiving any interruption in service. It is further desirable that the system be capable of acting in a stand-alone capacity as the sole service provider for an organization or in a back-up capacity as a redundant service provider for one or more service applications in the system. It is still further desirable that the system be capable of providing additional capabilities to the service, thereby improving the quality of the service data received or emitted by the service application. It is also desirable that the system provide administrative safeguards to prevent service administrators from misconfiguring service applications. It is also desirable that the system allow for efficient throughput of network traffic and seamless traffic snooping without complicated packet inspection schemes.

BRIEF SUMMARY OF THE INVENTION

In an embodiment, the invention includes a service appliance that is adapted to be installed between one or more production servers running one or more service applications and at least one service user. The production servers and their service applications provide one or more services to the service users. In the event that a production server is unable to provide its service to users, the service appliance can transparently intervene to maintain service availability.

In an embodiment, the service appliance is capable of providing the service using a service application that is differently configured or even a different application than the service applications of the production server. Additionally, embodiments of the service appliance include hardware and/or software to monitor, repair, maintain, and update the service application and other associated software applications and components of service appliance. In an embodiment, the service appliance is configured to have a locked state that prevents local running of additional applications other than those provided for prior to entering the locked state, limiting local and remote user administration of and operational control of the operating system and service application.

Upon being connected with the computer running the service application, an embodiment of the service appliance contacts the production server and/or service application and automatically replicates the service application's configuration and data, potentially including data from internal or external databases, if any exists. As additional data is added to or modified by the service application of the production server, the service appliance automatically updates its replica of the data.

In a further embodiment, the service appliance obtains all network traffic sent to the service application. While the service application is operating correctly, the service appliance can forward incoming network traffic to the service application, outgoing network traffic to its destination, and can perform that forwarding transparently at various network layers.

An embodiment of the service appliance monitors the service application. If the service appliance detects that the service application has failed or is about to fail, the service appliance cuts off the service application of the production server from the service users and takes control of the service. Using the replica of the data, the service appliance responds to service users in essentially the same manner as a fully operational service application and production server. While providing the service to service users, the service appliance updates its copy of the data in accordance with service users' needs. An embodiment of the service appliance monitors the network to detect when a service application provided by the production server or a replacement production server becomes available. Once the service appliance has detected that the service application has resumed functioning, an embodiment of the service appliance automatically updates the service application's copy of the data to reflect the current state of the data. Upon synchronizing the data of the service application of the production server with the service appliance's data, the service appliance reconnects the service application with the service users and simultaneously returns control of the service to the service application and its production server.

BRIEF DESCRIPTION OF THE DRAWINGS

The invention will be described with reference to the drawings, in which.

DETAILED DESCRIPTION OF THE INVENTION

Figure 1A:
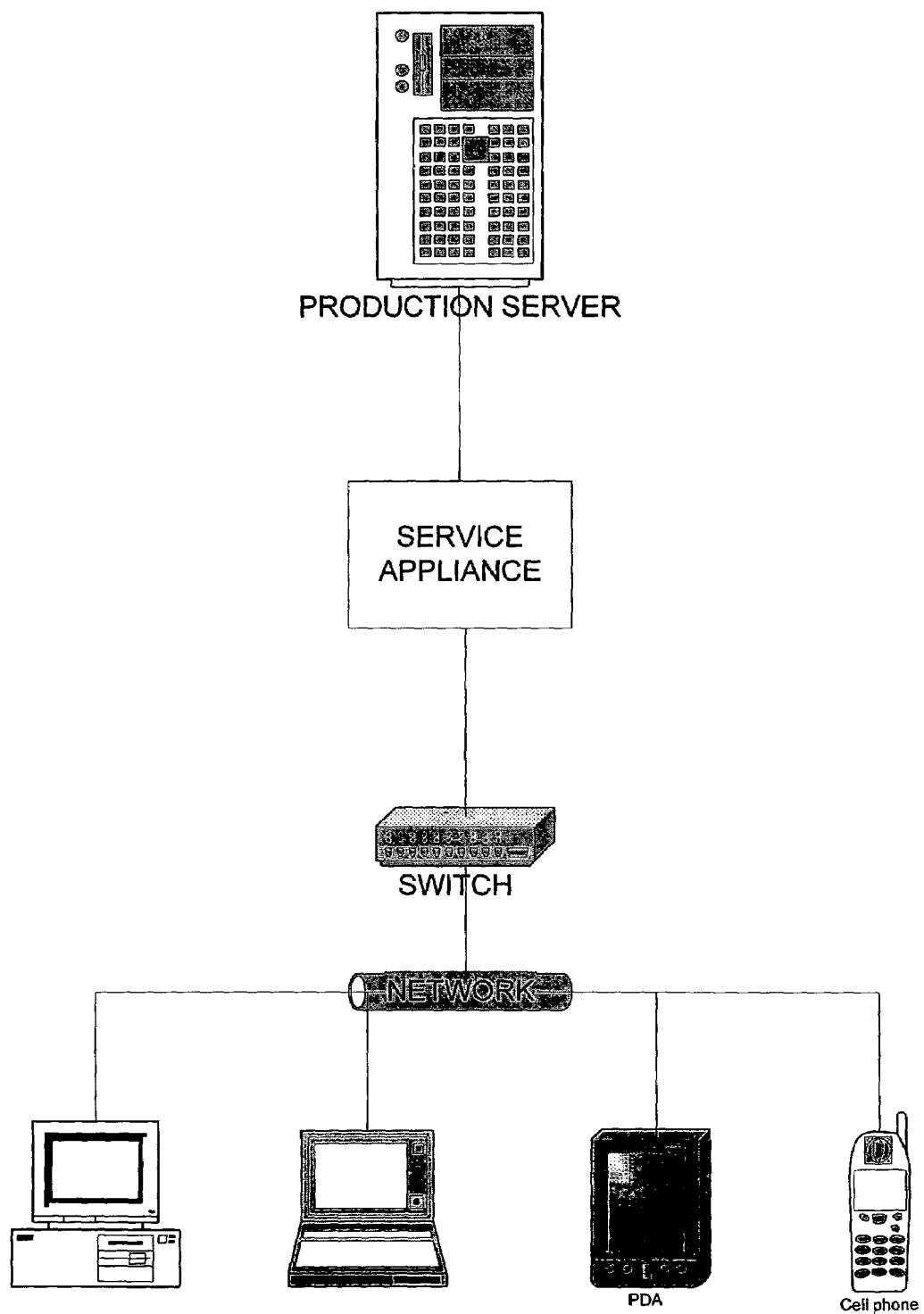
FIG. 1A illustrates an example installation of the service appliance in a protective configuration according to an embodiment of the invention.

FIG. 1A illustrates an example installation of the service appliance in a protective configuration according to an embodiment of the invention. In this embodiment, the service appliance is installed on an organization's network inline between a production server hosting a service application and the various client systems. In this application, client systems include any systems dependent upon a given service, including systems operated by users and potentially other dependent services. The service application provides a service to client systems. In this configuration, the service appliance relays all network traffic between the production server and the client systems. The service appliance monitors the operation of the production server and can take control of the service provided by the production server, for example in the event that the production server fails. As discussed in detail below, the service appliance can operate transparently, so that neither the production server nor the client systems are affected by the service appliance during normal operation; moreover, neither the production server nor the client systems need to be configured by an administrator to support the service appliance.

In an embodiment, the service appliance is installed by connecting it to a power source and to one or more network connections with each of the production server and the organization's network, respectively. In an embodiment, the service appliance is initialized by a service administrator using a web-based interface. The web-based interface may be located at a static IP address assigned to the service appliance, wherein the static IP address can be embedded in the service appliance at ship time or entered during initialization. In another embodiment, the IP address of the service appliance is assigned by a DHCP host on the network that provides an indication of the assigned IP address to the service appliance in response to a DHCP request from the service appliance. The service appliance can be pre-configured with a fixed MAC address or a MAC address from a prespecified range of MAC addresses or some other set of MAC addresses known to be used for instances of service appliances. In such embodiments, the service appliance might obtain its IP address via a network sniffer application, running for example within a web-browser of the service administrator, which locates the service appliance on the network using the MAC address(es) and provides an HTTP interface for a matching MAC address known to be associated with a service appliance. In those embodiments, the service appliance does not require an IP address to be assigned by physically interacting with the service appliance. In yet another embodiment, the service appliance is assigned the same network address as the production server.

In an embodiment, the service appliance is initialized with a minimal amount of information, including the network location of the production server and authentication information used to access the service application hosted by the production server. Using this information, the service appliance can access the service application and obtain any additional initialization information needed.

Figure 1B:
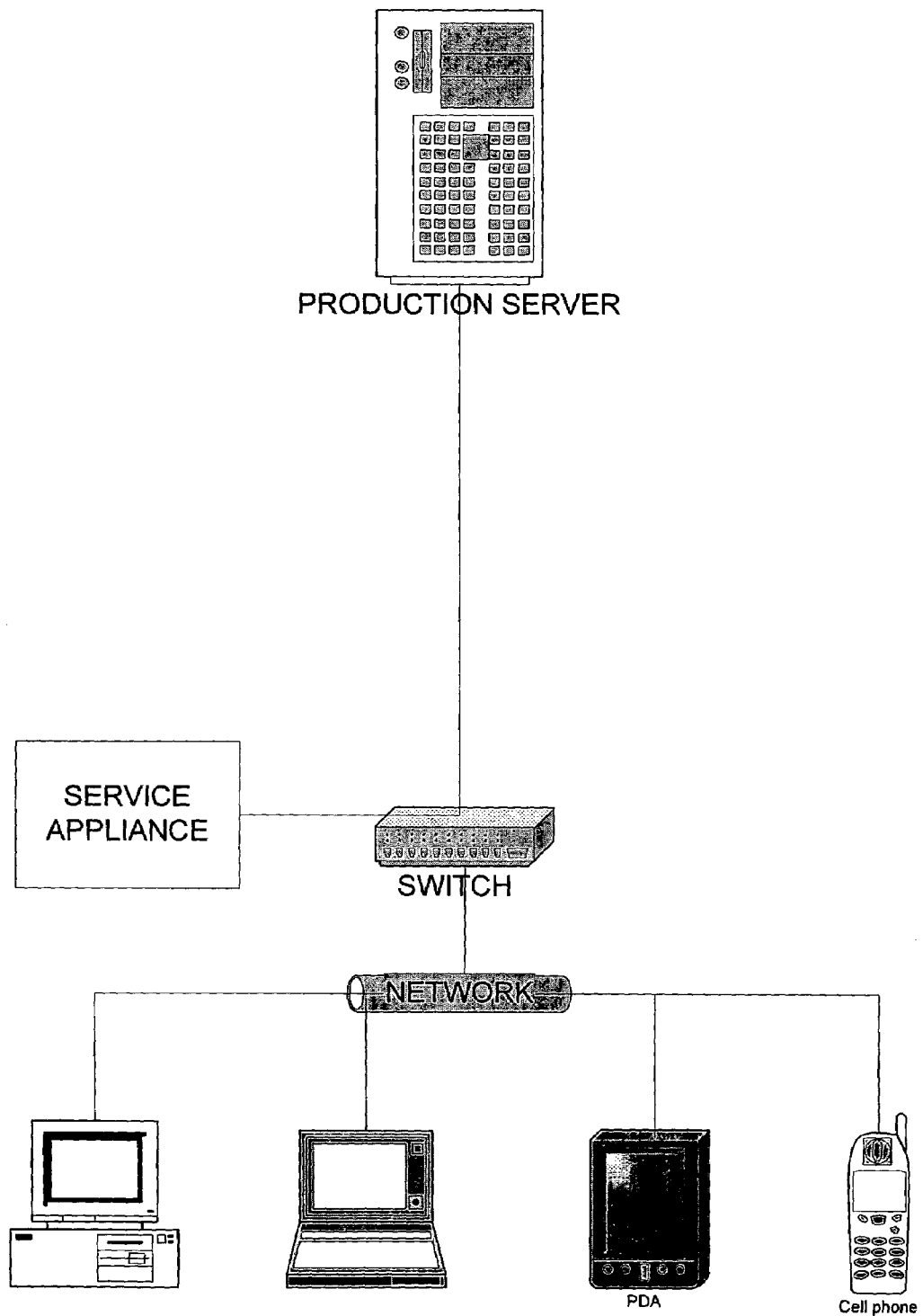
FIG. 1B illustrates an example installation of the service appliance in disaster recovery configuration according to an embodiment of the invention.

FIG. 1B illustrates an example installation of the service appliance in disaster recovery configuration according to an embodiment of the invention. In this embodiment, the service appliance is intended to serve as a disaster recovery aide in the event of the catastrophic failure or destruction of the production server. The functionality of the service appliance in this embodiment is substantially similar to that of other embodiments, including the ability to take control of the service normally provided by the service application running on the production server and the ability to transparently provide service to client and other dependent systems of the service. However, in a disaster scenario, the production server is permanently disabled or destroyed, and so considerations of relaying network traffic intended for the production server are rendered moot. Therefore, in this embodiment, the service appliance may be connected in parallel with the production server, provided that the service appliance can communicate over the network with the production server. This embodiment may also not require as sophisticated or costly a network interface. In a further embodiment, a service appliance operating in a disaster recovery configuration may either act as a router and/or network switch itself or utilize an attached network switch and/or router to facilitate communications with the production server.

Figure 2:
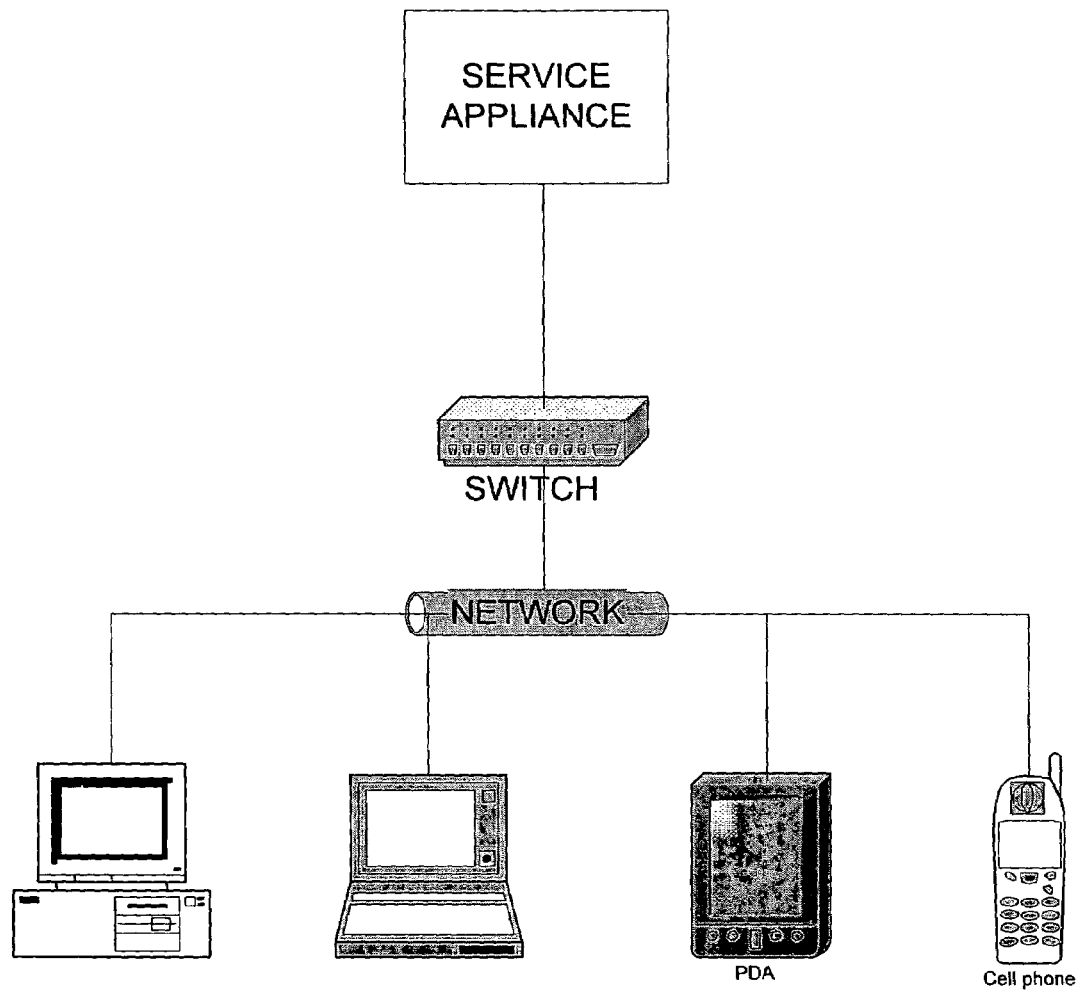
FIG. 2 illustrates an example installation of the service appliance in a stand-alone configuration according to an embodiment of the invention.

FIG. 2 illustrates an example installation of the service appliance in a stand-alone configuration according to an embodiment of the invention. This configuration of the service appliance provides the service to the organization, thereby eliminating the need for a production server. In an embodiment, the service appliance in a stand-alone configuration is essentially identical to the service appliance in a protective configuration, with the exception that in the stand-alone configuration, the service appliance is permanently in the failover state, discussed in detail below.

Figure 3:
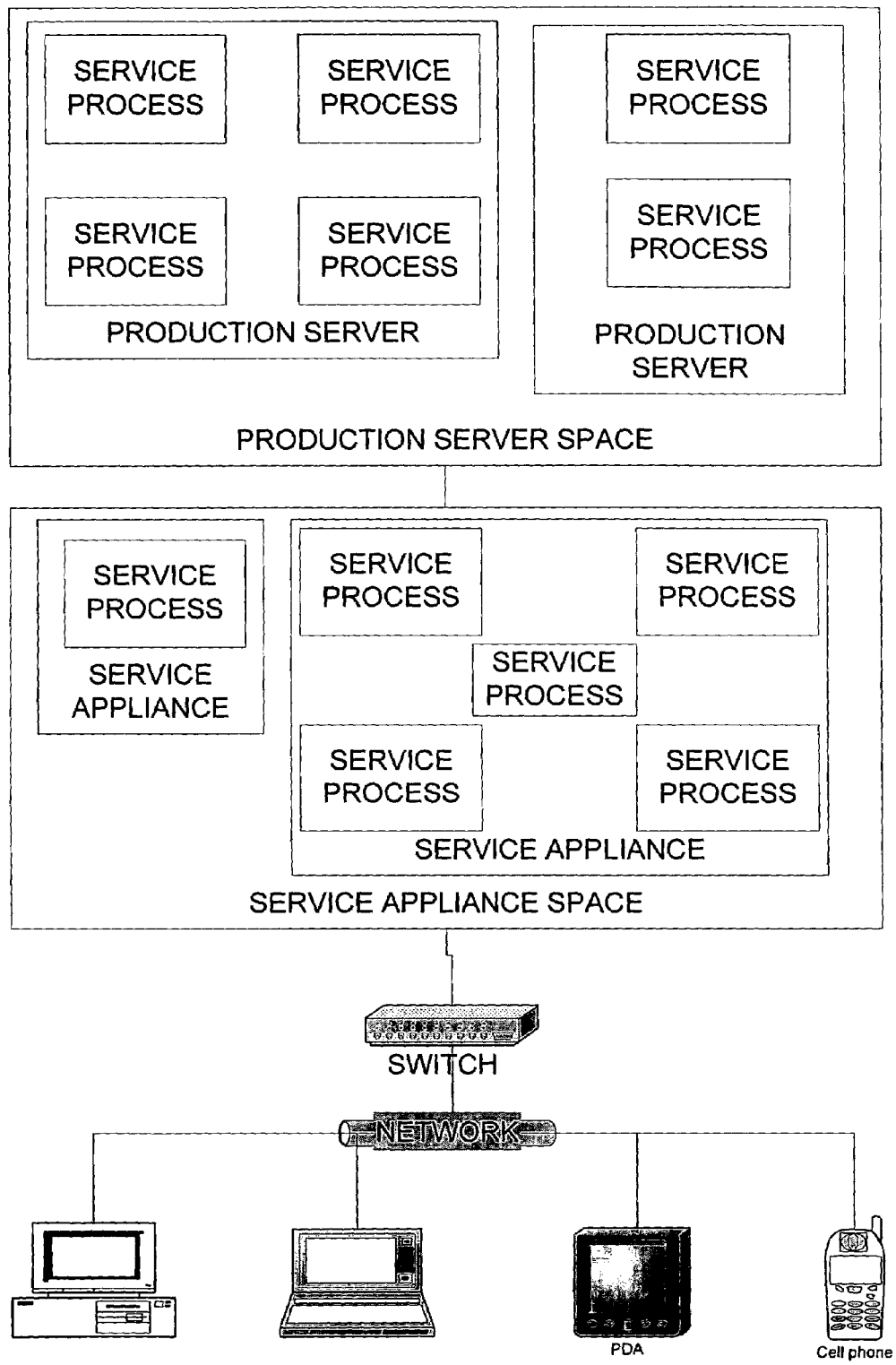
FIG. 3 illustrates an example installation of a first plurality of service appliances in a protective configuration of a second plurality of production servers according to an embodiment of the invention.

FIG. 3 illustrates an example installation of a first plurality of service appliances in a protective configuration of a second plurality of production servers according to an embodiment of the invention. In this example, a first plurality of service appliances are connected between the client systems and an arbitrary number of production servers. Each of the production servers hosts one or more service application processes. In the example of FIG. 3, at least a portion of the set of service appliances can protect any arbitrary portion of the set of service application processes. In addition, the allocation of service application processes to service appliances is independent of the allocation of service application processes to production servers. For example, a single service appliance can protect a plurality of service application process operated by one or more production servers.

Figure 4:
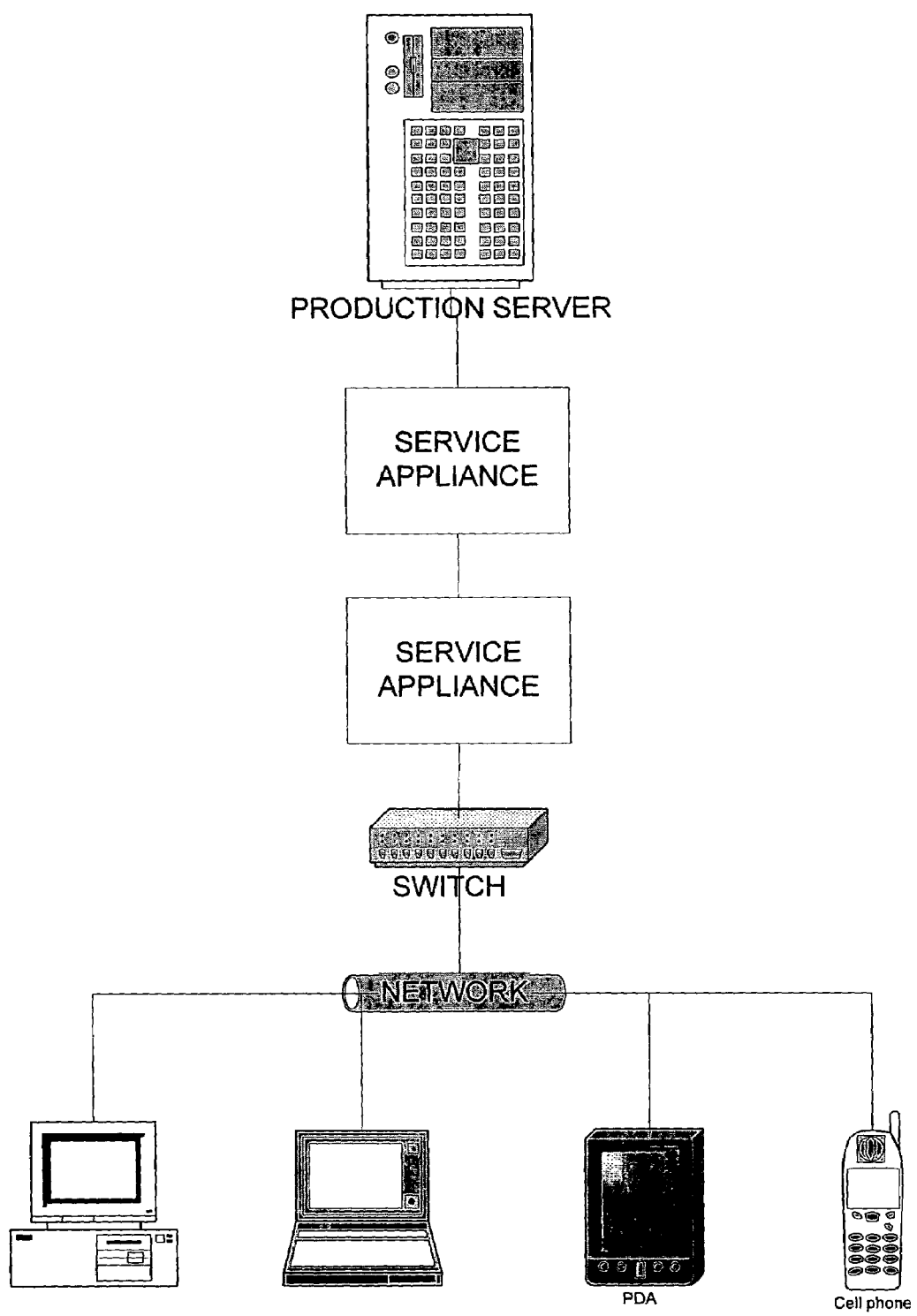
FIG. 4 illustrates an example installation of two service appliances in a double protective configuration according to an embodiment of the invention.

In a further embodiment, the service application processes of the service appliances, as well as additional processes attendant thereto, may be executed in one or more virtual machines running on one or more CPUs of the service appliances. In these embodiments, a virtual machine comprises at least one service application and additional attendant processes discussed in detail below. The virtual machine operates as a "virtual" server appliance that can be activated, deactivated, and optionally stored for later reactivation, FIG. 4 illustrates an example installation of two service appliances in a double protective configuration according to an embodiment of the invention. In this example, the service appliances are connected in series, such that the failure of either service appliance is automatically compensated for by the remaining service appliance. In an embodiment of this configuration, the first service appliance in the series perceives the second service appliance in the series as a production server, and protects the second appliance in the identical manner as the second service appliance monitors and protects the actual production server. There is no practical limit to the extent of this protective chaining.

Figure 5:
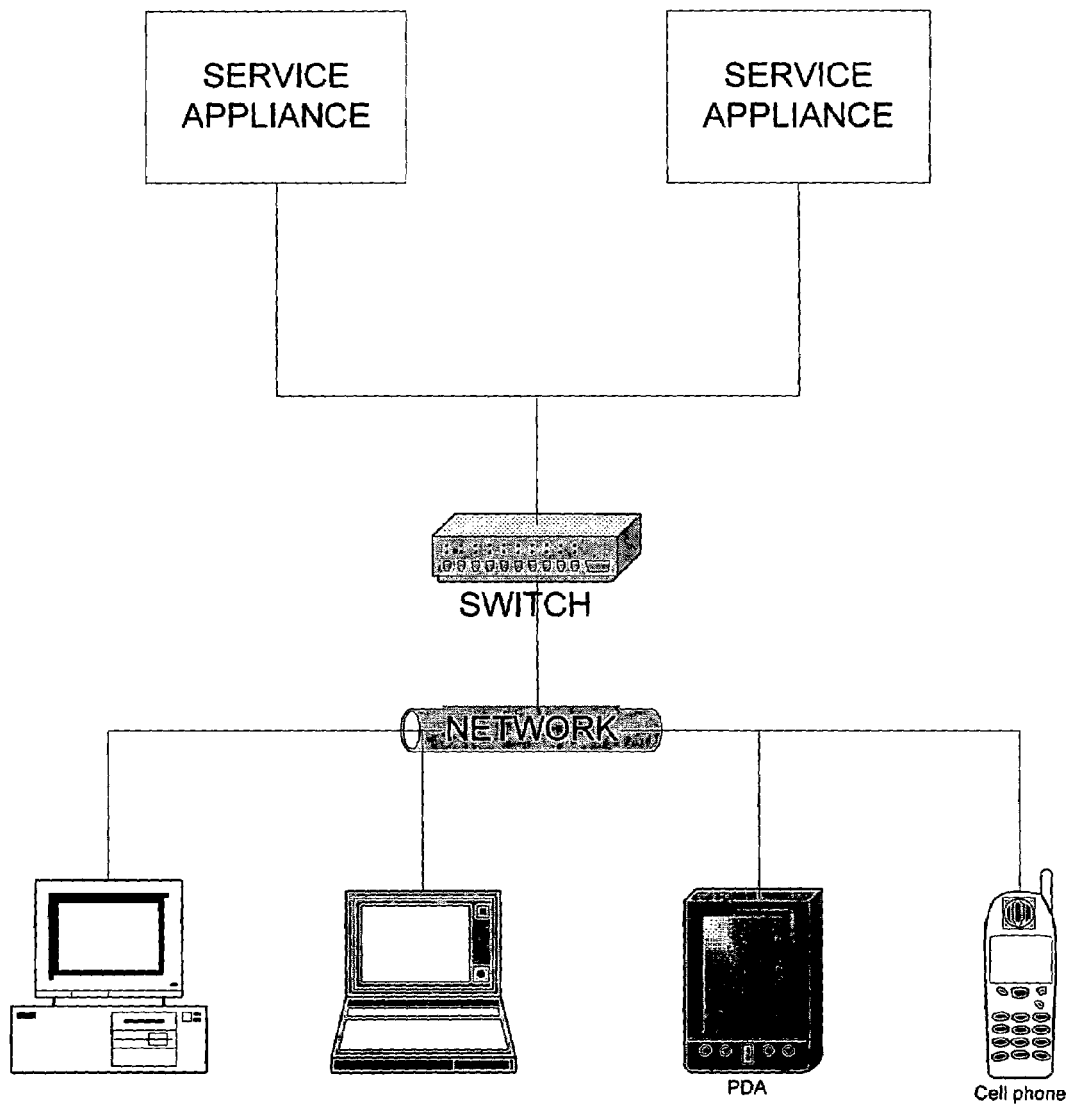
FIG. 5 illustrates an example installation of two service appliances in a double stand-alone configuration according to an embodiment of the invention.

FIG. 5 illustrates an example installation of two service appliances in a double stand-alone configuration according to an embodiment of the invention. In this embodiment, each service appliance is capable of providing the service to client systems. Additionally, each service appliance can compensate for its counterpart in the event that the counterpart cannot provide the service to client systems. In this embodiment, the service appliances can provide the same or different services during normal operation. There is no practical limit to the number of redundant service appliances in this configuration, and in some embodiments the storage, processing capability, and network processing capability each service appliance may be physically partitioned and multiply redundant as well. This redundancy capability is not limited to the aforementioned embodiment, and may be effected in other embodiments as well.

Figure 6:
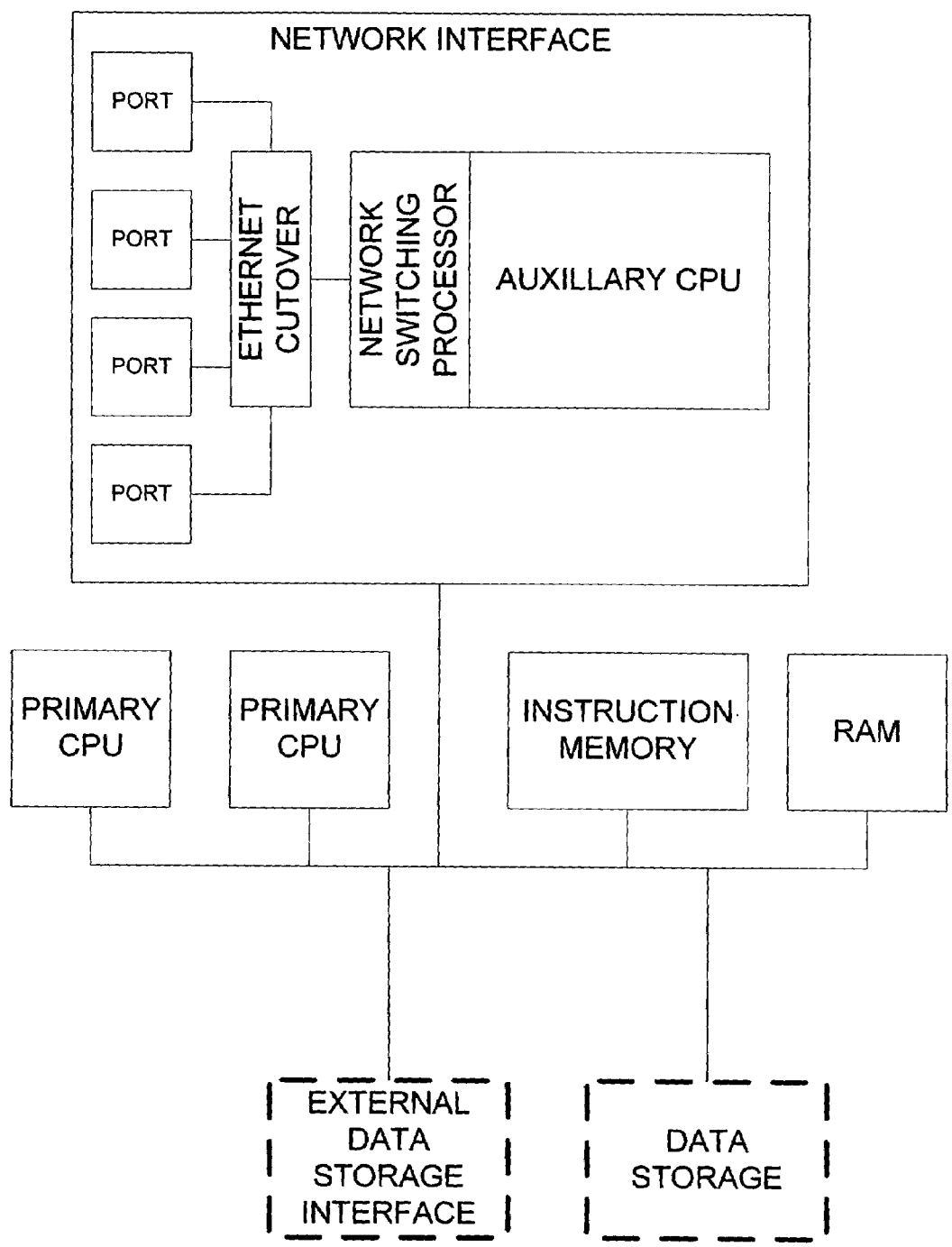
FIG. 6 illustrates an example hardware configuration of the service appliance according to an embodiment of the invention.

FIG. 6 illustrates an example hardware configuration of the service appliance according to an embodiment of the invention. In this embodiment, a network interface card includes a plurality of Ethernet ports, allowing for redundant network connections to both the production server and the network to which client systems are connected. The Ethernet ports are connected with a network processor, which can be any device adapted to examine and coordinate network communications traffic), that is used to analyze and route network packets. In an embodiment, the network processor provides the functionality of a layer 2 network switch. The network processor is connected with an auxiliary CPU. The auxiliary CPU supervises the operation of the network processor and provides routing and analysis functions of any combination of networking layers 3 through 7. In an embodiment, the network processor and the auxiliary CPU are an integrated unit in which the network processor, without a distinct auxiliary CPU, routes and analyzes at any combination of networking layers 2 through 7. As discussed in detail below, an embodiment of the auxiliary CPU also performs part or all of the self-monitoring and self-repair functions of the service appliance. An embodiment of the network interface further includes an Ethernet cutoff mechanism so that when the service appliance is powered off or otherwise not functioning, the ports are electronically or optically connected together to allow network traffic to flow between the production server and the rest of the organization's network. In additional embodiments, the server appliance can use other networking protocols besides Ethernet and/or TCP. In another embodiment, software running on the primary CPU(s) of the service appliance, or on the CPU(s) of another motherboard effectively serving the role of network interface, or in a virtual machine executing on any configuration of such CPU(s), provides the functionality of both the network processor and auxiliary CPU.

The network interface card is connected with a data bus of the service appliance. Also connected with the data bus are a main CPU, RAM and distributed or isolated non-volatile memory. In an embodiment, the service appliance includes one or more storage devices, such as hard disk drives, for storing an operating system, application programs, and/or service data. The storage device can be a RAID array of disks for improved reliability. In an alternate embodiment, an external storage device interface, such as a SCSI interface, a FibreChannel interface, or an iSCSI interface running on the same Ethernet ports of the network interface or different Ethernet ports, enables the service appliance to use external storage devices for some or all of its data storage needs. Additional component, such as cooling systems and power supplies, are omitted for clarity. Moreover, the system of FIG. 3 is intended for illustration and other hardware configurations and/or software configurations known to one of ordinary skill in the art may be used to implement the service appliance, including dual or multiple processors in place of the main CPU and/or the use of virtual machine software to emulate the functionality of one or more of the above hardware components.

The service appliance shown in FIG. 6 can have a variety of physical configurations. For example, all of the components of the service appliance can be integrated into a single housing adapted to fit within standard computing equipment racks. In another example, the network interface card and the remaining portion of the service appliance hardware can be configured as two or more separate units, such as blade computer units Communication between the network interface card and the remaining portion of the service appliance can utilize any type of internal or external data bus standard, including message passing protocols operating on top of a switched Ethernet or similar link layer protocol backplane.

Figure 7:
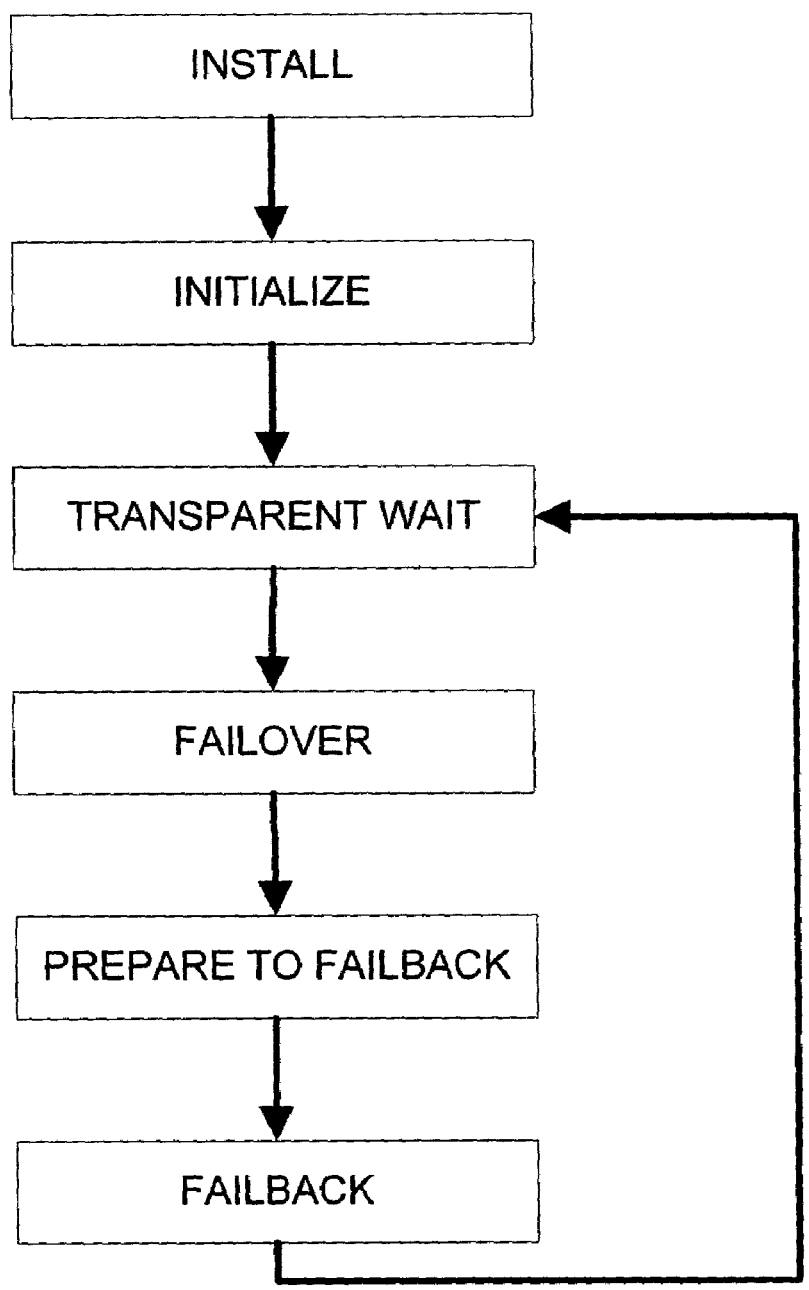
FIG. 7 illustrates the states of the service appliance according to an embodiment of the invention.

FIG. 7 illustrates the states of the service appliance according to an embodiment of the invention. As an example, the states of the service appliance are discussed with reference to an example service appliance intended to replicate an electronic mail, contact manager, calendaring, and collaboration service application, such as Microsoft Exchange. However, the service appliance can implement other service applications, including databases, web servers, directory services, and business applications such as CRM (customer relationship management), ERP (enterprise resource planning), SFA (sales force automation), financial applications, and the like.

In summary, an embodiment of the service appliance described with reference to an example of a specific service application has five states following installation:

1. Initialization—Following the installation of the service appliance, the service appliance is configured and automatically replicates e-mail, calendaring and relevant configuration information from the production server onto itself.
2. Transparent wait—The service appliance passively stays in sync with the production server and is ready to take over servicing of e-mail and calendaring requests in case the production server fails.
3. Failover—The service appliance detects the production server failure and takes over the servicing of e-mail and calendaring requests from systems and users connected to the production server.
4. Prepare to fail back—The service appliance determines that the production server, possibly but for missing service data, is capable of providing the service; the service appliance auto-replicates the e-mail and calendar data back to the production server so that the production server can get e-mails received and handled by service appliance while the production server was down
5. Failback—The service appliance has completed replication of e-mail and calendaring data to the production server. The service appliance now hands over the "authority" to service e-mail and calendaring requests back to the production server. The service appliance returns to the Transparent wait state (state 2).

The operation of these states will now be described in greater detail. The initialization process can start immediately after the physical process of installation. In the example of a service appliance for electronic mail, contact manager, calendaring, and collaboration software, as long as the customer does not take too long (i.e., more than a few minutes), even clients, connected to a service application at the time of such connection process, should not lock up. The worst-case install outcome of the service appliance will be that end-users would have to re-try their last client operation.

Once installed, the service appliance can be initialized by the service administrator as discussed above. In an embodiment, the service appliance can offer a web-based configuration page with few elements, such as text boxes to input the highest-level service application administrator name and password, the unique Active Directory (henceforth referred to as AD) or NT domain identity of the production server hosting the service application (such as Exchange 2000/2003 or Exchange 5.5, respectively), and the fixed IP address, and sub-network (as applicable) of the production server. In other embodiments or installation cases, such as those using DHCP, the service application administrator will not have to enter some of the information listed above.

Once the administrator enters the aforesaid parameters, an embodiment of the service appliance will assume the administrative authority using the configured administrator name and password and will follow at least the following steps:

Step 1—Replicate the service application configuration information relating to connectivity protocols and routing. Connectivity protocols include application programming interfaces and/or associated communication format standards typically used to facilitate communications between client systems and/or production servers with service applications.

Step 2—Replicate the directory information that supports the mail-enabled users served by the service application on the production server (for example, AD-related information for Exchange 00/03 and DS information for Exchange 5.5). In an embodiment, this information is replicated using a connectivity protocol to retrieve service data from the production server.

Step 3—Replicate the existing service data of the service application hosted by the production server, such as the e-mail and calendaring information in the mailstore of the production server for every mail-enabled user served by the production server. Similarly to step 2, connectivity protocols can be used to replicate this service data on the service appliance. In an additional embodiment, the service appliance performs additional validation of the service data, for example by checking for corruption, cleansing, transformation, and virus-checking. In further embodiments, the service appliance can screen service data to ensure compliance with policies set by the network operator, such as corporate privacy, security, and data reporting policies, which can be developed to meet a corporation's specific needs or to comply with laws such as HIPAA and Sarbanes-Oxley.

Step 4—Replicate the information of the production server's service application necessary for service functioning. Similarly to step 2, an embodiment of the service appliance uses connectivity protocols to replicate this service data.

In a further embodiment, the service appliance may additionally support the selection of a portion of the set of service users to be served by service appliance in case of production server failure. In that case, an additional step 2.5 above will display the list of service users, such as mail-enabled users (obtained in step 2), and will allow the customer to select the users to be served from the list. Another embodiment enables the service appliance to allow protection for a selected number of days/megabytes of mail per user. In a further embodiment, policy will automatically dictate these actions.

In an embodiment, to provide transparency during this phase, the service appliance will use the unused network bandwidth to perform the necessary replications; alternatively, the service administrator will have the choice to opt for the fastest possible initialization where the service appliance appears to the production server as another busy service application client.

During Step 1, the service appliance will issue a series of connectivity protocol requests, such as RPC calls or the like to the production server. These connectivity protocol requests return with information about the configuration and state of the production server.

In an alternate embodiment, the service appliance may elect to ignore service application configuration information that is highly situational.

In an embodiment of Step 2, the service appliance will issue a series of AD-related connectivity protocol requests to two AD entities, modalities of which include the local Domain Controller (DC) and the nearest Global Catalog (GC), to read user and service-related information.

During Step 3, the service appliance would make Microsoft Exchange mail database connectivity protocol requests and/or use other methods (e.g., MAPI) to replicate onto itself the complete data of every user mailbox on the production server. The replication will be repeated for all the applicable mailboxes.

Since the production server will be operational while the replication will be in-progress, a "stutter-step" series of replications will probably be needed to achieve exact replication. The initial replication will replicate service data at least up to the time that the initial replication occurs. A second replication is used to copy service data added or modified during the initial replication. Each succeeding replication will address a smaller and smaller set of possible changes to the mailboxes, over a smaller and smaller latency window, until the mailbox is deterministically in sync. For example, during an initial three-minute replication of a 2 GB mailbox, a user might receive 10 MB of new e-mails and alter the metadata of or, alternatively, delete fifty messages. To replicate those changes is generally a matter of seconds, and to cover any changes possible in those few seconds in yet another replication is a matter of fractions of a second, and so forth.

During the transparent wait state, the service appliance will perform three tasks:

Task 1—Pass traffic through to the production server without performance degradation Task 2—Maintain synchronization of the service data of the service appliance with the service data of the service application hosted by the production server.

Task 3—Keep the service appliance up using its value added software (includes self-maintenance, self-applied best-practice heuristics and patch application processes)

It should be noted that even though Task 3 is described here, it is built into the overall lifecycle of the service appliance operation that includes the five states of the service appliance described in the beginning of this document.

For Task 1, the service appliance will pass through all network traffic, (including potentially lethal transactions) to the production server. An exception to this is administrator traffic that is screened and optionally blocked or altered by the administrative safeguards feature discussed below.

To facilitate Task 2, an embodiment uses a "snooping" method that clones Ethernet frames using the spanning-port-like functionality present in a number of gigabit Ethernet networking chips, including controllers and switches. An alternative software-only approach will be a zero-buffer-copy at the lowest possible level of the network stack on the service appliance (via a filter driver). In still another embodiment, an RPC API is used to periodically access the service data stored by the service application and to retrieve service data modified or added since the previous synchronization access. Any one or more of these methods may be combined.

Since the service appliance will forward all network traffic to the production server, there will be no issue with the production server receiving and processing messages and requests that manipulate those messages. On the service appliance, the copy of the network packets that constitute those requests and message data will proceed "up the stack" in normal fashion to the various service application processes. As the service application processes engage with the assembled requests and messages, specific implementations in Task 2 will be able to process them, as needed, using event handlers. These event handlers are traps applied to all of the relevant Exchange 03 processes on the service appliance. Since Exchange 03 itself uses such traps for its own internal event handling, they are relatively high performance. The end result is that the service appliance will have a copy of every message received and processed by the production server, whether it arrives via ESMTP, POP3, IMAP, MAPI, MTA, or Outlook Web Access (OWA), over TCP or HTTP.

It should be noted that in an embodiment the performance of the traffic snooping described above is not a significant issue. Because the service appliance will not be actively serving any clients during this state (Transparent wait), it will have the luxury of buffering and queuing its captured frames for processing.

Task 2 ensures that the data stored in the service appliance remains in lock-step with that of the production server. In other words, when the service appliance assumes authority for the production server's service, end-users should not see missing or incorrectly represented messages out of the service appliance's data. This task will be performed using a combination of two or more different approaches.

In a first embodiment, an "over the wire" synchronization is achieved using the traffic snooping done in Task 1. As part of the snooping, the service appliance will copy in-flight administrative transactions on the wire as well as the message transaction traffic (commands which apply to messages as well as the message data itself.) The service appliance will do this to maintain the in-process transaction cache that will primarily be used to "play" to the service appliance in the event that the production server dies without completing transactions in flight. Each incomplete transaction queued in the cache will be flushed when the service appliance sees the transaction completion signal pass through it from the production server. Additionally, the service appliance gets sufficient state information about messages from snooping that it may also be able to make better determinations of which messages on the production server need to be replicated (or can be skipped). This approach is applicable to a large class of service applications, such as relational databases.

In an alternate embodiment, the snooped message traffic could be "played" on the service appliance to mimic the same actions undertaken by the production server with that traffic. This "playing" solves many synchronization issues in a non-intrusive fashion. For example, determining what should happen when a user on Outlook (e.g., via MAPI RPC interaction with Exchange) or Outlook Web Access deletes a message, or when a Eudora user gets unread messages waiting for them out of the mailstore via POP3. Since the production server sees every single packet it would normally see, the ultimate behavior of the production server with regard to altering message state in response to user or to other external stimuli is no different than it would be if the service appliance were not there in the first place. The service appliance, through snooping, will be capable to receive the net identical stimuli. Again, with event handlers, the service appliance can take whatever action deemed appropriate. But if it chooses to simply pass on the stimuli through its appropriate Exchange processes, then when a message is read, deleted, edited, or moved to a folder, the state of the message on the service appliance and the production server will be identical.

In a further embodiment, the service appliance can augment the production server in a load balancing configuration. In this embodiment, the service appliance selectively serves up read requests (for example, 60%+ of the production server's actual load). The production server can then be reached to "touch" the service application meta-data (e.g., message meta-data) for the service application data item (e.g., message) that the service appliance handled to reflect its new state. This post-fix of the data store on the production server is in fact much less CPU, disk, and network intensive than if the production server actually handled the read, so there should still be a large net gain in performance.

A second embodiment for synchronization does not require examination and processing of service application data (e.g., message traffic) bound through the service appliance for the production server and is an extension of the initialization code, using connectivity protocol requests, such as MAPI, to replicate service application data (e.g., messages) on a granular basis (e.g., mailbox by mailbox) periodically.

In a further embodiment, maintaining synchronization with the routing and mail processing configuration of the production server is not a network or processing intensive task. Because this information is a) not likely to change frequently and b) is not sizeable, an hourly replication process (which will not involve that much information transfer) may be sufficient. Also in regard to task 2, maintaining sync for the service appliance with the DC and the GC is neither a frequent nor intensive process. Because many users and entities are unlikely to be added or deleted on a daily basis, let alone hourly, even in a large organization, re-invoking the original DC and GC sync code some small number of times a day is typically sufficient.

Under an embodiment of synchronization, the service appliance "sweeps" the production server every so often. The sweeping will help keep the service appliance in sync with the production server in the event that autonomous processes on the production server (such as, security, backup or Exchange-resident auto-archive process) move service application data (e.g., messages) off the production server, perhaps via a storage area network, or perform some other operation which would not be visible to the service appliance snooping on the wire. The statistical likelihood of a production server failing right after it has archived or deleted a bunch of messages, without the service appliance having had a chance to synchronize (resulting in the service appliance then cheerfully and unknowingly presenting those messages to users), is very small.

In a further embodiment, given that the service appliance is constantly replicating to itself, at an object level or granularity (e.g., mail object, database record, other atom of data), it is in fact performing a service similar to that of a backup service. However, as the service appliance does not blindly copy bits or blocks, but instead obtains the service application data object as a whole, the service appliance is capable of inspecting service data, (e.g., for signs of database corruption) and improving the quality of service data (e.g., virus cleansing or database transformation operations).

Additionally, an embodiment of the service appliance intrinsically has the capability to transfer all the objects under its jurisdiction—both those originally copied during installation and initialization from the production server, and those modified or instantiated during transparent wait and/or failover and/or failback states—as a consequence of its synchronization technology (as described herein). Therefore, it is in fact capable of doing both incremental and wholesale restoration of the service data under its jurisdiction to either the original production server or any replacement thereof. Consider the failback case, as described herein. Wholesale restoration is simply the case of failback from the service appliance to a production server which has no, or a severely diminished, service application database.

In yet another embodiment, the service appliance facilitates migration of a service from an existing production server to a new production server potentially running new service application(s) as follows. First, the service appliance is connected with the existing production server in a manner permitting the service appliance's synchronization to operate, thereby replicating the existing service application data and any eventuating changes thereto. Once the service appliance is synchronized with the service application on the existing production server, the service appliance is disconnected from the existing production server and connected to the new production server. During this period of disconnection, the service appliance continues to handle any on-going service duties requested by the client systems. After being connected with the new production server, the service appliance is instructed to failback to the new production server. Using its failback synchronization mode, the service appliance restores all of the service application data to the new production server.

An embodiment of task 3 of the transparent wait state includes several features. First, the service appliance will protect itself from the vulnerability to error of a standard Windows server, including indeterminate downtime from patch applications, using a "system reliability manager." The system reliability manager monitors the performance of the service appliance and can terminate and restart any processes or applications that have failed, including rebooting the operating system if necessary. The system reliability manager includes a number of heuristic-based "watchdog" processes running on the service appliance will ensure that the service appliance itself stays up.

For example, if the protection server's or customer's network-based anti-virus protection fails, it is possible that one of the Outlook clients served by the service appliance would be infected by a virus or worm. The service appliance will monitor its own SMTP queues to detect the kind of intense mail-traffic from a single client typical of virus or worm infections. Such monitoring will also prevent the service appliance from being compromised (no matter how small the chance might be) and used as an outbound spam emitter.

In another embodiment, the service appliance runs anti-virus, anti-spam, or other security or value-added functionality applications or services. The service appliance's system monitoring layer and system reliability manager enables such additional applications to be provided by the service appliance in a stable and robust fashion not typically possible outside of the context of the service appliance.

The service appliance will also monitor a number of its own performance and functionality metrics, compare them to its best practices heuristics list, and make adjustments if necessary. For example, if the service appliance notices that certain storage performance limits on the service appliance are being exceeded, it will alter its storage methodology.

In an additional embodiment, the service appliance is a closed system. Because of this the service appliance can be preconfigured with a list of valid processes. By monitoring the active processes and comparing them to the list of valid processes, the service appliance can readily identify and terminate an unauthorized process, such as one introduced by a virus or worm. In a further embodiment, the service appliance keeps an exact byte count and checksum of every piece of code on disk, updated if and when patched. Any change in size or checksum will indicate a Trojan horse attempt, and the offending file can be purged and reloaded from a volume only accessible to the service appliance supervisory kernel.

In an embodiment, some or all of the system reliability manager is executed on the auxiliary CPU associated with the network interface card discussed above. In another embodiment, the system reliability manager is run on a separate CPU independent of the network interface card discussed above. In another embodiment, the system reliability manager is run underneath or parallel to a virtual machine application or supervisory kernel, either on the primary CPU(s) or another processor.

The second aspect of the third task of the transparent wait state ensures that the operating system and service application processes inside the service appliance are properly patched. As discussed in detail below, the service appliance includes a specially-configured version of the service application that is capable of providing the service to service users in the event the production server fails. To avoid the problems associated with incorrect or defective software patches, an embodiment of the service appliance receives an optimal patch configuration from a central network operations center. The network operations center tests software patches extensively on its own set of service appliances to determine whether software patches are to be included in the optimal patch configuration. Because the service appliance is a closed system, the configuration of each service appliance is essentially identical. Therefore, patches that operate correctly during testing at the network operations center are also ensured to work correctly on service appliance deployed by customer organizations.

In an embodiment, the network operations center can communicate approved software patches over an SSL connection to the service appliance in need of the patch. The SSL connection for the service appliance will be created by the service appliance polling over an outbound SSL connection to the set of network operations center servers hosting the patches. For the SSL transactions, the service appliance will use multiple layers of certificates that have been independently certified for security.

In another embodiment, a dual CPU service appliance runs one copy of its processes on one CPU, while evaluating the patched "stack" on the other CPU. If any errors (including production server failure) are detected during patching or significant performance degradation immediately after patching, it will restore the operating image from an untainted copy it will maintain. The service appliance will likely keep the restoration image on a volume not accessible to the primary file system (e.g., NTFS), but only to the supervisory kernel. This approach will be one more defense against bugs or corruption, as well as against attacks by viruses operating even at the system level of the primary kernel (e.g., NT). In another embodiment, the patched processes run on the primary CPU(s) of the service appliance while being evaluated and controlled, as described above, by the system reliability manager running on the auxiliary CPU.

The third aspect of the third task of the transparent wait state enables the service appliance to process "over the wire" administrative traffic (copied during Task 1) to prevent erroneous or debilitating administrative instructions from reaching the service application on the production server. The stateful inspections of administrator interactions with the service application on the production server are referred to as administration safeguards. In an embodiment of administrative safeguards, the service appliance examines the snooped administrative instructions both in vacuum, and in context of a transaction log of all prior such instructions, both compared against its heuristic map of best practices for maintaining a fault-tolerant service application server. For example, the service appliance will examine the network traffic passing through and understand the administrative requests destined for the production server to ensure it does not mimic something disastrous upon the production server (e.g., replicating mass user deletions). On the other hand, a user may do something entirely legitimate with the production server that the service appliance will take into account. For example, they may delete a single user who is leaving the organization, or they may shut off OWA services in response to a security threat.

In an embodiment, the failover state includes two steps:

Step 1—The service appliance detects a failure condition on the production server and prepares to take over the servicing of e-mail and calendaring requests from the production server Step 2—The service appliance proxies for the production server and serves e-mail and calendaring requests masquerading as the production server to the end users Step 1 of the first task of the failover state includes:

Task 1—Identify failure modalities of the production server without either jumping the gun (i.e., false positives) or letting key events go by (i.e., false negatives)

Task 2—React appropriately to the failure and prepare the service appliance to take over from the production server In an embodiment, task 1 detects failure modalities on the production server through at least one of three approaches. The first approach will be to allow the human administrator of the production server to click a button on the service appliance administration UI signaling that the production server is down and the service appliance should take over.

The second approach will be for the service appliance to use existing health detection mechanisms possibly further enriched using the service appliance's value-add detection code. In particular, existing health detection mechanisms will be required to 1) probe the state of the service application, such as an Exchange 5.5 production server; and, 2) handle improperly configured service applications or non-existent health detection mechanisms. An embodiment of this approach uses a WMI service running on the production server for the most sophisticated failure detection. Typically, there is a vast arsenal of statistics about service applications such as Windows Server (including Active Directory), and even in minimal customer configurations, service application process behavior and health can be extracted at a fairly frequent time interval without major performance impact on the production server and its service application; and, b) similar detection codes are implemented and in use by most existing service application clustering and other solutions.

From the above data, the service appliance will be able to tell fairly quickly and deterministically if a number of failure conditions are occurring on the production server. Some examples of such failure conditions on the production server include 1) service application data errors; 2) the storage below a critical threshold; 3) major processes are stopped or non-responsive for a significant period of time; and 4) Network connections to the production server break and a number of retries to reestablish connection fails. Such failure conditions could be considered deterministic and binary in nature—if one or more of them are true, then any external observer would agree that the production server is failing or has already failed in its function.

The moderate complexity of the detection task arises from the permutations of failure possible on a production server, as well as shades of gray in determining what constitutes a failure. To handling the permutation cases, an embodiment of the service appliance includes a failure heuristics module that emulates, for example using a Bayesian analysis based on a set of predefined policies, the decision process that a set intersection of customers would be likely to make.

In a further embodiment, service administrators can select a set of heuristics from a library of heuristics includes with the service appliance to be used to determine the production server failure. Service administrators can also select Boolean combinations and weightings of failure conditions, or alternatively, a set of slider bars ranging from "aggressive" to "lax", the setting of which determines how the service appliance would behave in detecting and responding to failure on the production server. In this embodiment, the value of the slider bar is a natural input to the kind of weighting algorithms the service appliance can use in its failure heuristics modeling.

In conjunction with the service administrator having control over the set of failure heuristics, an embodiment of the service appliance includes a mechanism to: 1) warn the administrator up front about the consequences of their actions; 2) send the administrator an e-mail with a record of the settings they changed, along with any warnings they engendered; 3) keep a non-volatile record of all such transactions to record changes to the set of heuristics for the purposes of reviewing administrator actions.

The third approach to the production server failure detection interfaces with service application monitoring modules/applications, such as those provided from vendors such as NetIQ, HP (OpenView), IBM (Tivoli), and CA (UniCenter). All of these systems augment or even provide their own instrumentation of a given production server, and some of them offer some level of intelligence in reporting (to their determination) the production server failure.

The second task of step 1 of the failover mode prepares the service appliance to take over the service of e-mail and calendaring requests from the production server, after the service appliance has determined the production server failure. Since the service appliance is already in-line with the network traffic (part of State 2—Transparent wait), the only additional work that service appliance needs to do are 1) stop forwarding only e-mail and calendaring traffic to the production server; 2) allow the natural responses of the service appliance's service application process to go out to the network; and, 3) pass through administrative traffic to/from the production server (e.g., Telnet, Windows terminal server traffic, administrative probes and, SNMP) so that the remote administrator(s) can bring the production server back up. In other embodiments, such as ones intended to assist with disaster recovery, this step is simplified because the production server is assumed to be destroyed or otherwise effectively destroyed. Therefore, in these embodiments, not all of these tasks are necessary.

In step 2 of the failover state, the service appliance will service the e-mail and calendaring requests on behalf of the production server. The service appliance will already have (as a result of Initialization and Transparent wait states tasks) a complete copy of every item of service application data (e.g., all message items including notes, calendar items, etc.) that a user would need to see from the production server. The service appliance will also have all the free/busy data necessary to conduct calendaring transactions. It will also already be running all the service application processes (e.g. OWA) necessary for the service appliance to communicate with the same entities with which the production server was previously communicating. It should be noted that messages committed during this period by the service appliance to the mailstore will not be mapped or bound to the production server, since the production server is down. The back-synchronization of service application data (e.g., messages received by the service appliance while the production server is down) from the service appliance to the production server will be discussed below.

In an embodiment, one of the first things that the service appliance will do in Step 2, is to "play" the incomplete transactions from its transaction cache up through the service application process "stack" on the service appliance. This activity essentially will complete these transactions from the user's perspective, since the service appliance will now be their mail server. The service appliance will continue to update its internal representations of external data sources, such as the GC and DC during this state. However, the service appliance is a sealed, locked-down entity. It is not subject to administrative instructions or interrogation from the outside world, nor is it likely to be "entangled" to other service application servers in the same organization. If the service appliance is running what turns out to be the DC or GC for the routing group or sub-group of the production server, the service appliance AD will not be replicating to other ADs. When the production server (possibly including the DC or GC process) comes back up, it will be the responsibility of the production server to deal with updating information relevant to all of its relationships (e.g., other ADs, other Exchange servers, etc.).

In an embodiment, the preparing to failback state includes the steps:

Step 1—Detect that the production server is once again functional

Step 2—Back-synchronize, from the service appliance to the production server, the service application data (e.g., messages) received by the service appliance on behalf of the production server during the production server's down-time In an embodiment, step 1 can be performed using two approaches. First, the service appliance could require the administrator of the production server click a button on the configuration/administration screen of the service appliance to indicate to the service appliance that the production server is live (to that administrator's satisfaction). The second approach would be for the service appliance to in essence run the failure heuristics module in reverse. If all the deterministic failure conditions are false, the production server could be considered to be up again. The information to reach this conclusion would come from the service appliance intermittently probing the production server while the service appliance is in the failover state.

In Step 2, the service appliance would back-synchronize from itself to the production server all of the service application data (e.g., message data) that the service appliance received on behalf of the failed production server. Some combination of techniques for replication from the Transparent wait state, can be applied in reverse (from service appliance to production server, instead of vice versa).

The service appliance would be back-synchronizing two classes of information in embodiments that relate to service applications concerning electronic mail, calendaring, and collaboration: 1) the state of any message that was touched by an end-user served by the production server during the service appliance's down-time (e.g., read, deleted, forwarded, replied to, edited, changed in priority, etc.); and, 2) messages received and processed by the service appliance on behalf of the production server during the service appliance's downtime.

Alternatively, a reductionist approach to back-synchronization takes any message received by the service appliance during the production server's down-time, stuffs it into an ESMTP-format file, and write that file into the appropriate queue directory of the production server. The production server, as it came back to life, would then pick up the file and process the message all the way through into the mailstore, with the same net effect (from a user perspective) as if the production server had been up all along.

In yet another embodiment, the service appliance would use some combination of the initialization and transparent wait synchronization approached discussed previously; however applied in reverse to synchronize the production server with the service appliance.

As the back-synchronization step progresses, the service appliance would still be servicing e-mail and calendaring requests. And, as long as the service appliance continues to handle requests, the state of its mailstore would potentially be changing (e.g. users deleting, forwarding, or otherwise operating on old or new mail), and the production server theoretically would never be in true synchronization with the service appliance. The service appliance would likely use a staggered approach to break the tie, as described below.

In an embodiment, once the production server is fully back-synchronized from the service appliance, the failback state of the service appliance returns to the Transparent wait state, as described above. In another embodiment, the failback state can be applied on a granular level, for example on a per user or per account basis, with the service appliance returning control of the service to the production server for specific users as the associated service data becomes synchronized on the service appliance and the production server, while the service appliance continues to control the service for users with unsynchronized data. In another embodiment, the service appliance simply reverses the "stutter step" approach for synchronization of service data for the service application hosted by the production server with the service data maintained by the service appliance during the failover and failback states, and at the end of such process, the service appliance returns control of the service to the service application of the production server for some or all of the client systems.

Figure 8:
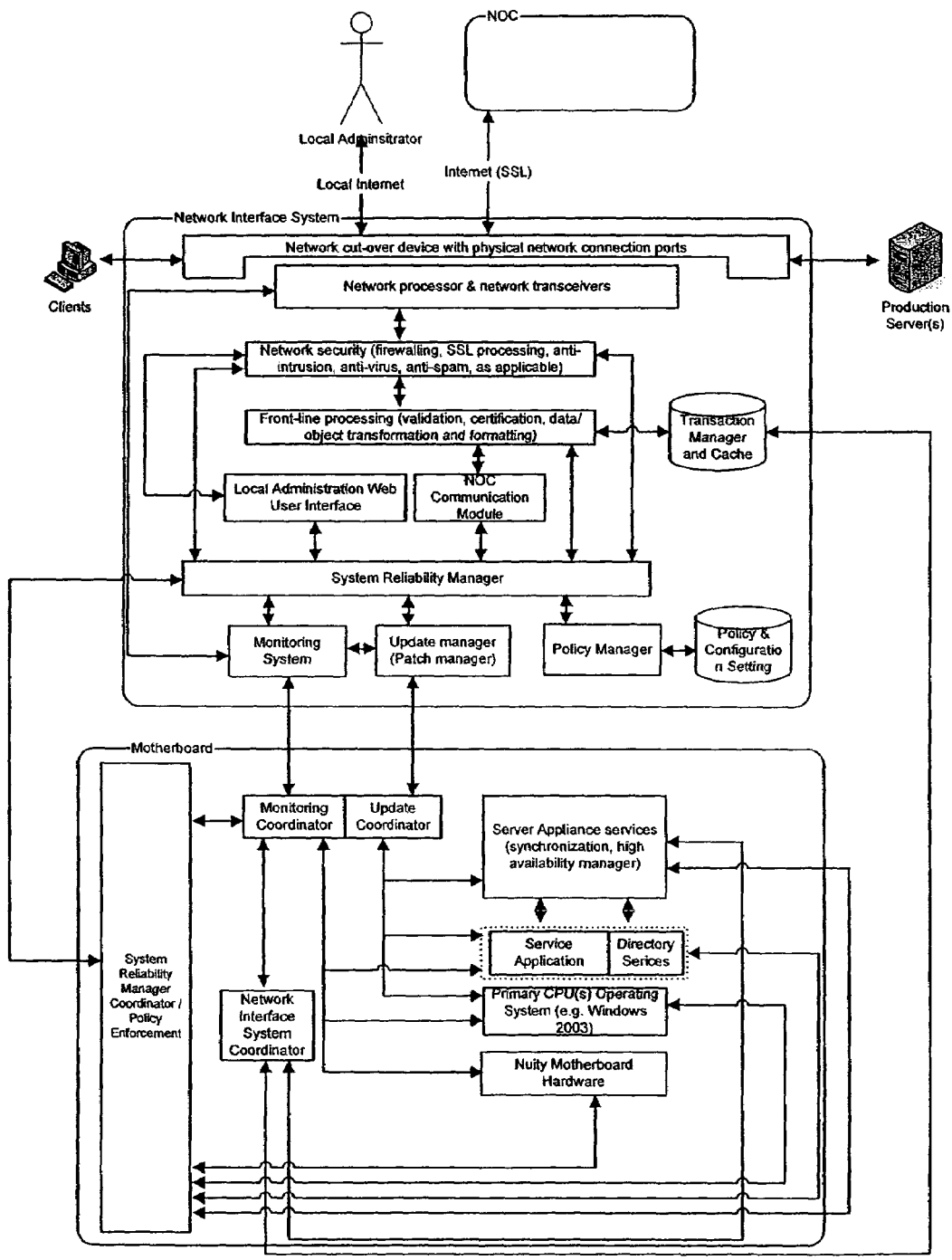
FIG. 8 illustrates a runtime architecture of the service appliance according to an embodiment of the invention.

FIG. 8 illustrates a runtime architecture of the service appliance according to an embodiment of the invention. In this embodiment, the service appliance is configured to provide an electronic mail service. The runtime architecture includes modules for implementing the states described above. In this implementation, the runtime module includes an operating system and a service application to be used to provide the service to service users in the event the production server fails.

Figure 9:
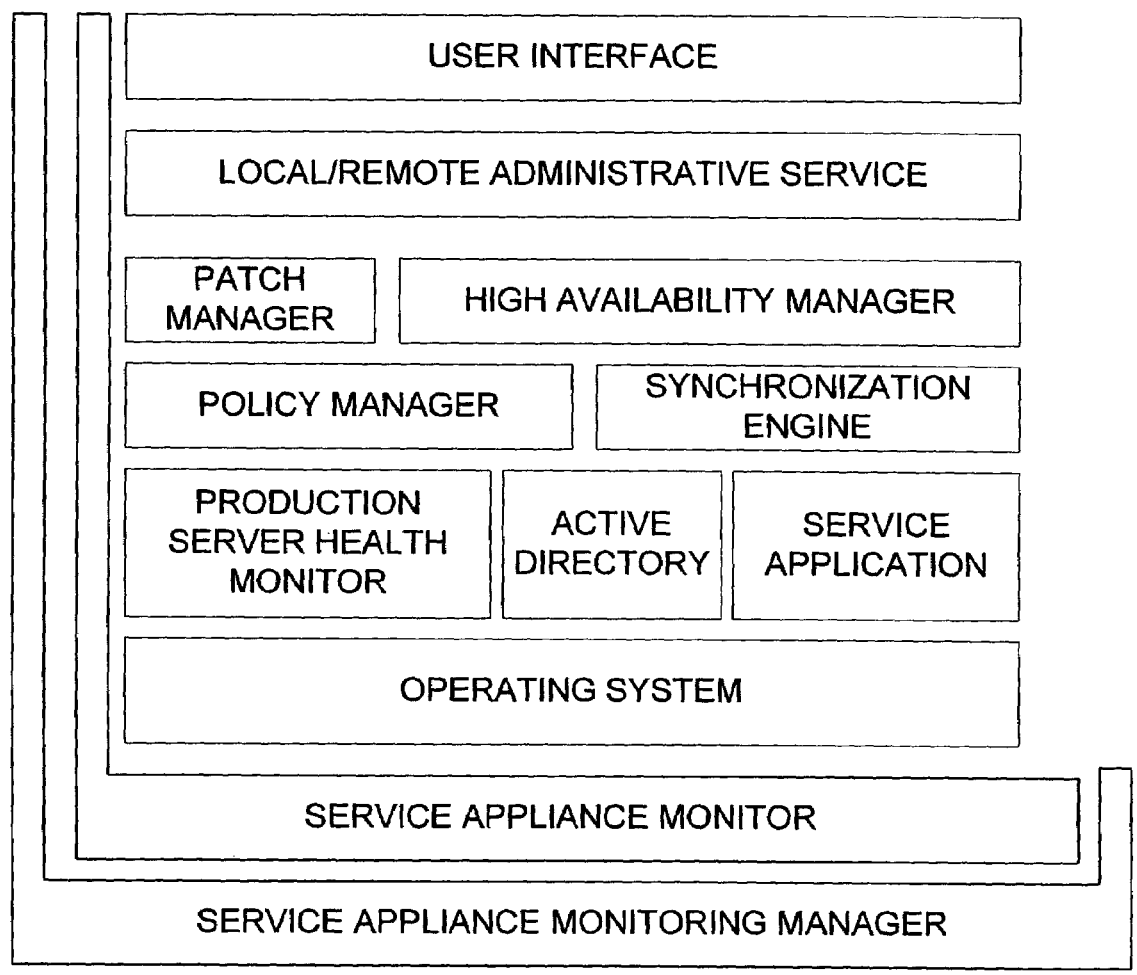
FIG. 9 illustrates a component architecture of the service appliance according to an embodiment of the invention.

FIG. 9 illustrates a component architecture of the service appliance according to an embodiment of the invention. In this example, the software components of the service appliance include an operating system, a production server health monitor, and a service application and supporting modules (for example, Microsoft Exchange and a directory service).

The service application receives service data from the synchronization engine, which is used to synchronize data from the production server.

The policy manager assists in enforcing proper operational policy, including security and operational configuration, on the service appliance and in some embodiments can extend this role to the production server.

The production server health monitor monitors the health of the production server to determine if the service appliance should take control of the service.

The high availability manager assists in supervising and coordinating availability across service appliances and/or constituent components thereof, any or all of which may be in a distributed configuration.

The patch manager supervises the retrieval, installation, verification, and if necessary, the removal of software updates for the service appliance.

A local/remote administrative service and user interface enables service administrators to control the service appliance.

The service appliance component architecture includes a service appliance monitor, which monitors the software processes and hardware of the service appliance, and a service appliance monitoring manager, which responds to monitoring information to maintain the service appliance's performance, for example by terminating and restarting components and software processes on the service appliance, restoring storage partitions, and changing hardware operation on the service appliance.

In an embodiment, the component architecture of the service appliance includes a supervisory kernel, for example an embedded Linux kernel executing on an auxiliary CPU. The supervisory kernel interfaces with the reliability modules to monitor and control the operation of the service appliance, and can kill and restart any of the software processes, including for example the Microsoft Windows operating system, if an error occurs.

Figure 10:
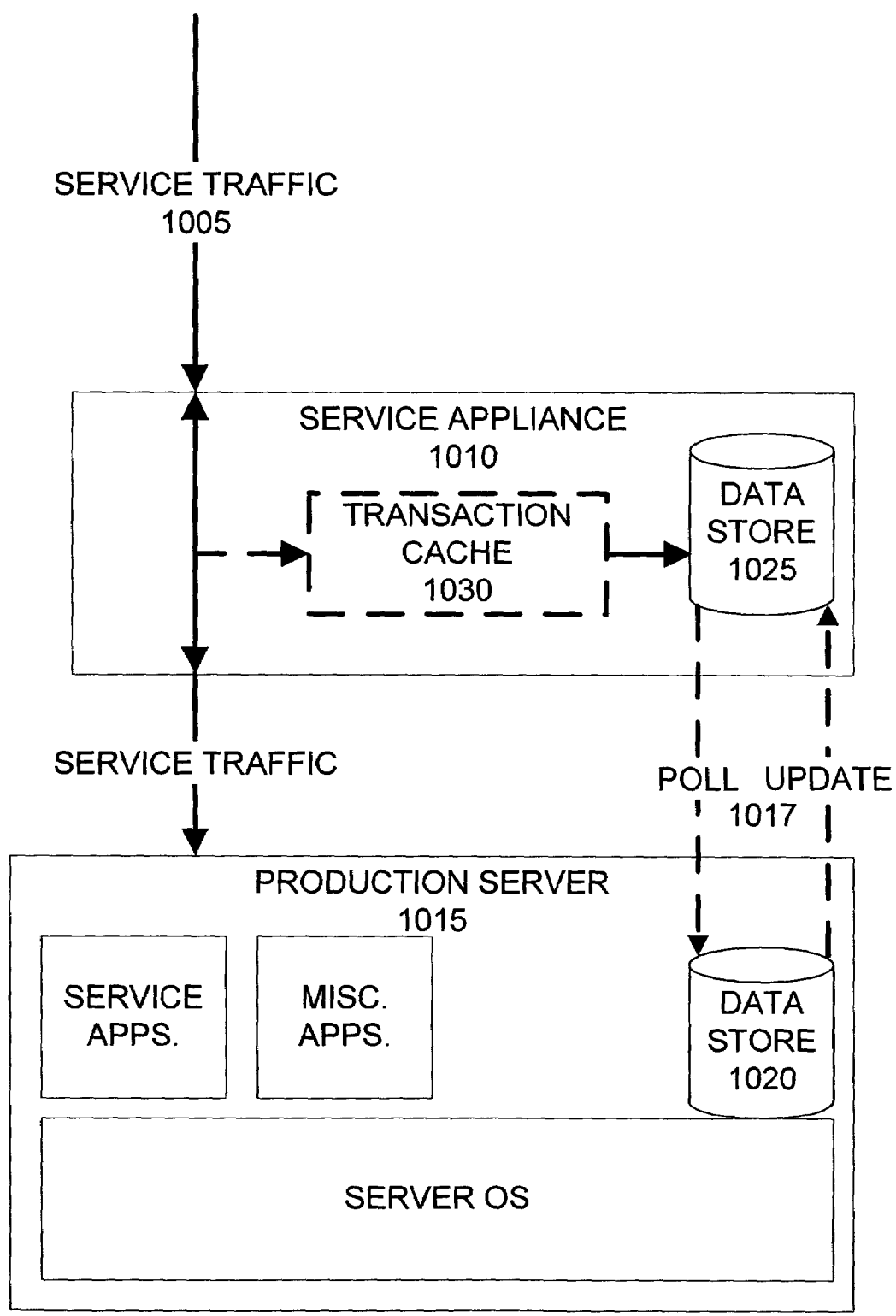
FIG. 10 illustrates the flow of data to a service application and the service appliance while the service appliance is in a transparent wait state according to an embodiment of the invention.

FIG. 10 illustrates the flow of data to a service application and the service appliance while the service appliance is in a transparent wait state according to an embodiment of the invention. The flow of data in the transparent wait state is described in detail above. In summary of a first embodiment, service traffic 1005 received by service appliance 1010 is forwarded to the production server 1015. Using a synchronization API or other type of interface 1017, the service appliance 1010 polls the production server 1015 to retrieve updated service data from the production server's 1015 data store 1020. The updated service data is stored in service appliance's 1010 data store 1025.

In another embodiment, a copy of the service traffic 1005 is stored in transaction cache 1030. The contents of the transaction cache 1030 are presented to a service application executing on the service appliance 1010, which updates the contents of data store 1025 accordingly. Assuming the outputs of the service applications on the service appliance 1010 and production server 1015 are deterministic, the contents of the data stores 1020 and 1025 will be the same.

Figure 11:
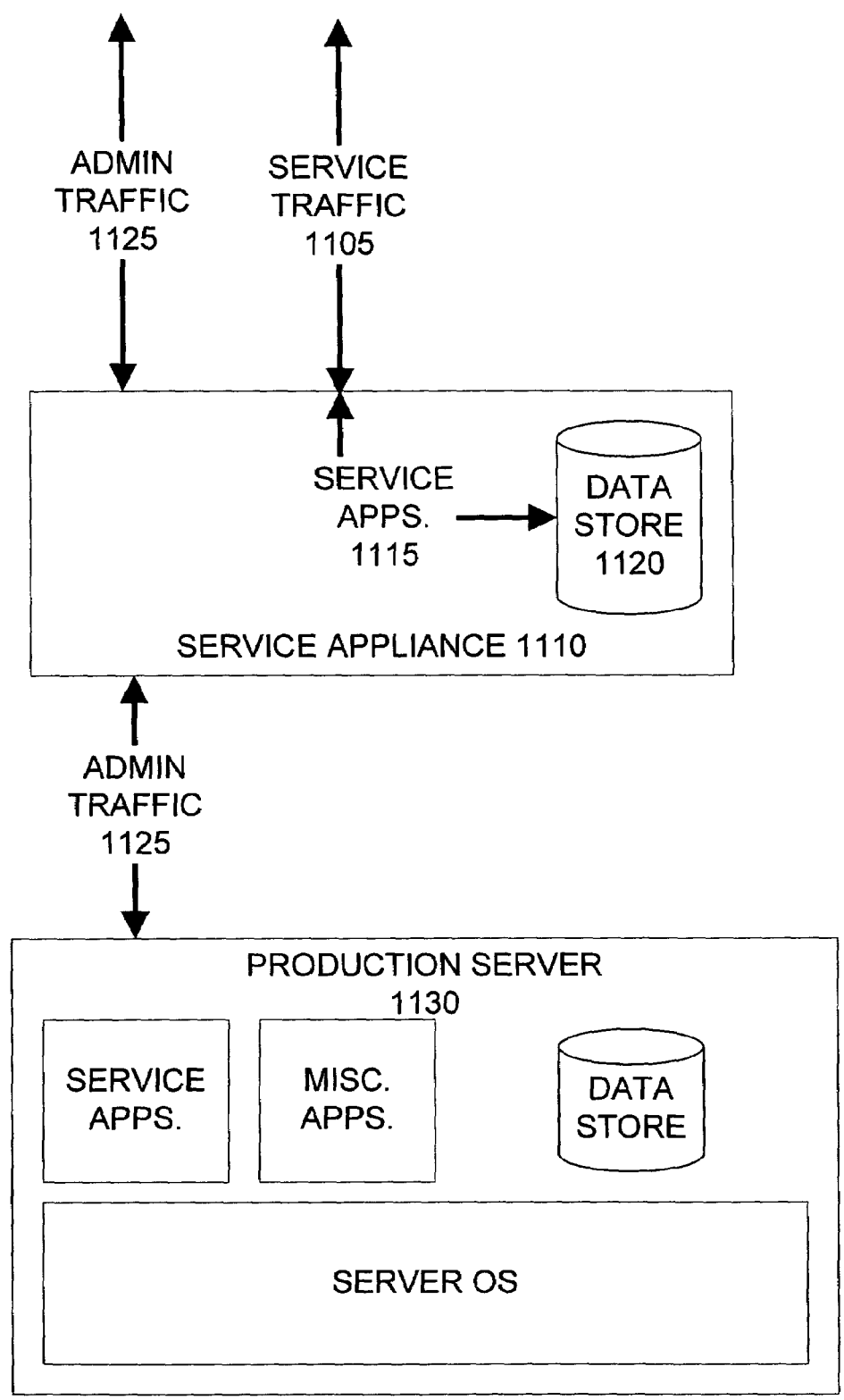
FIG. 11 illustrates the flow of data to a service application and the service appliance while the service appliance is in a failover mode according to an embodiment of the invention.
Figure 12:
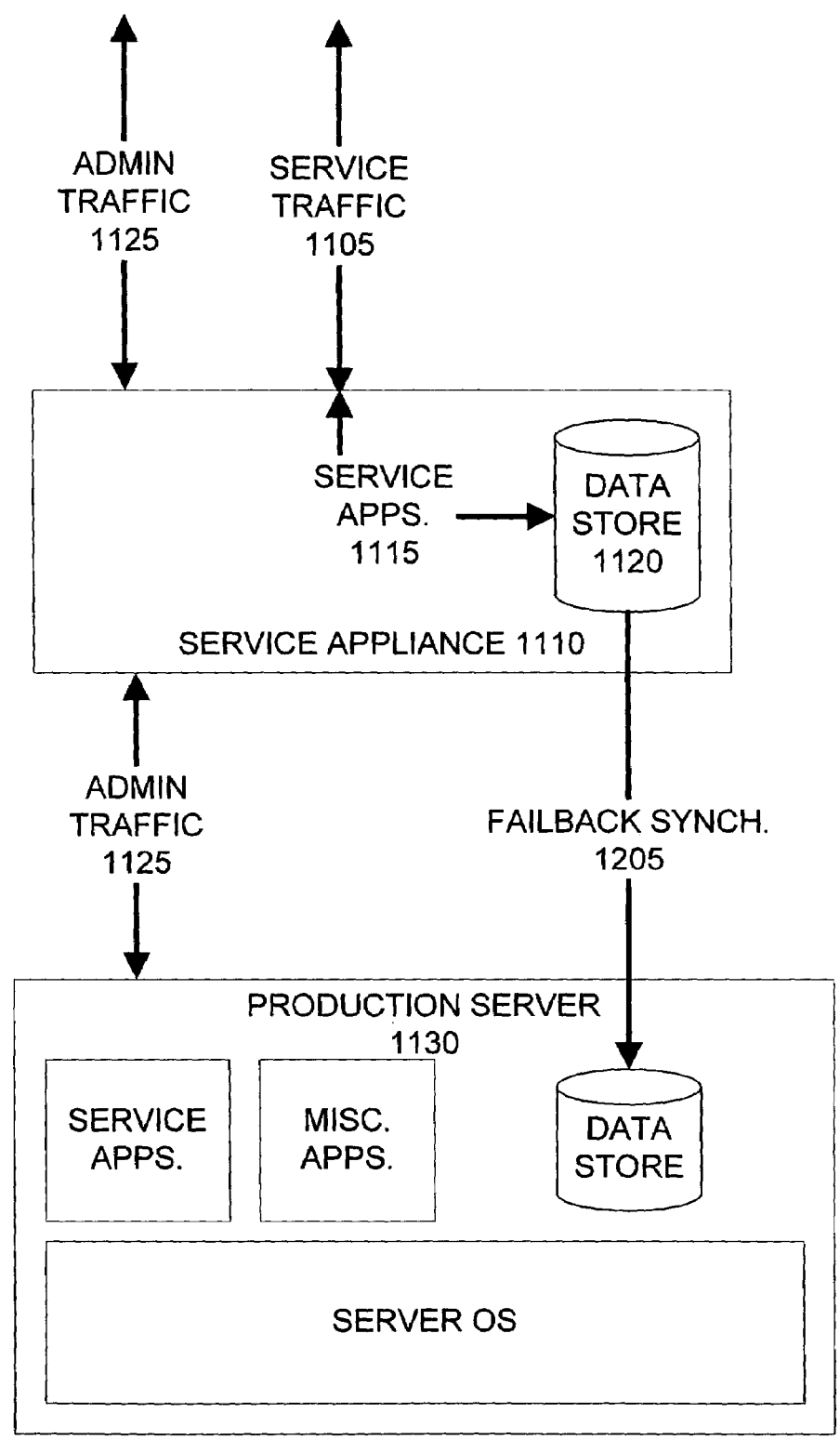
FIG. 12 illustrates the flow of data to a service application and the service appliance while the service appliance is in a failback mode according to an embodiment of the invention.

FIGS. 11 and 12 illustrate the flow of data to a service application and the service appliance while the service appliance is in failover mode and failback modes according to embodiments of the invention. The flow of data in these modes is described in detail above. In summary, service traffic 1105 is intercepted by the service appliance 1110 in both modes. The service traffic is processed by one or more service applications 1115 running on the service appliance. Service applications 1115 update data store 1120 with service data. Administrative traffic 1125 directed to the production server 1130 is selectively passed through the service appliance 1110 to the production server 1130. This enables administrators to control the production server to attempt to restore its functionality while the service appliance 1110 provides uninterrupted service to client systems.

Upon determining that the production server 1130 is operational, the service appliance 1110 enters failback mode, shown in FIG. 12. In this mode, the service appliance 1110 provides updated service data 1205 from its data store 1120 to the production server 1130.

Figure 13:
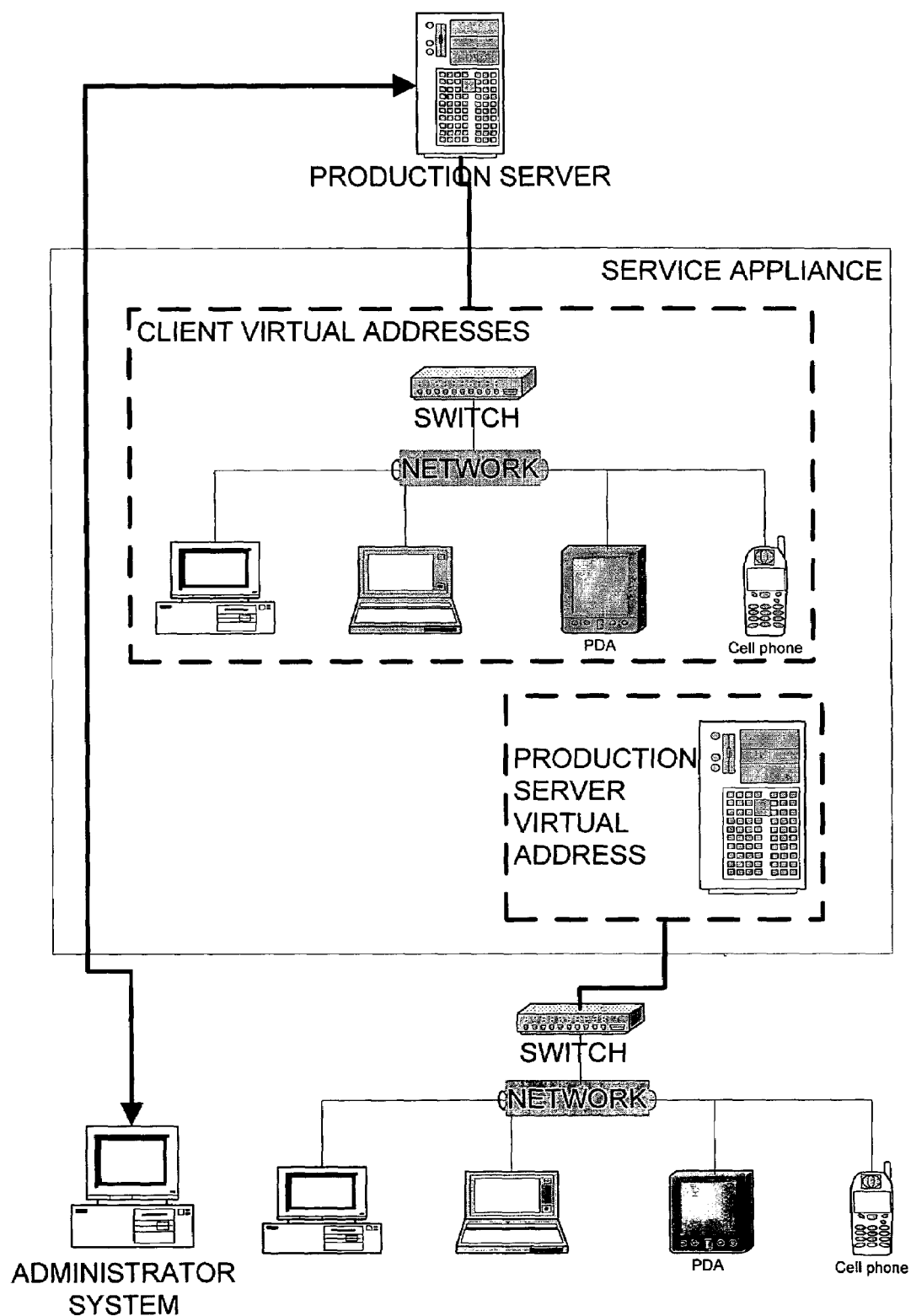
FIG. 13 illustrates a network configuration enabling the service appliance to transparently function between the production server and client systems, according to an embodiment of the invention.

FIG. 13 illustrates a network configuration enabling the service appliance to transparently function between the production server and client systems according to an embodiment of the invention. In this embodiment, a feature of the networking protocol, such as virtual LANs enabled by 802.1q is used to create a first virtual network that redirects IP addresses normally associated with client systems to the service appliance. As a result, all of the production server's communication with client systems is automatically redirected to the service appliance. Similarly, a second virtual network redirects IP addresses normally associated with the production server to the service appliance. As a result, all of the client systems' communications with the production server is automatically redirected to the service appliance. The service appliance can then redirect the network traffic to its intended destination by swapping packets' network identities. This can be done automatically with layer 2 switch hardware, eliminating the need for more complicated stateful packet inspection systems in many cases, although this technique can be combined effectively with packet processing at layer 3 and higher, both stateful and stateless.

In a further embodiment, the service appliance includes additional features to ensure accurate replication and maintenance of service data. Even though an embodiment of the service appliance is replicating at the object level, instead of the bit level, there is the possibility that it is replicating corrupt objects. For example, a RAID controller failure (perhaps of the write-back cache) could corrupt the meta-data or even the contents of a given message object in the store of the production server's service application.

An embodiment of the service appliance addresses this problem. The first is that there are some simple heuristics to detect corrupted objects. Bad or nonsensical meta-data (a creation or modification date with negative numbers, text data in a numerical field, etc) can be detected to some degree. For objects that the service appliance has already replicated, the service appliance can hash the non-volatile meta-data and comparing it to a hash of the meta-data of the in-bound objects to indicate if something is amiss. Also, tests can detect overwrites of the content of objects that do not have the modification flag set. For example, if the service appliance hashes the contents of an object, and then get a hash-match failure, and the meta-data indicates that the inbound object has not been edited, then that object would be suspicious.

Whether an object is corrupt can never be programmatically determined in an absolute sense for all classes of service applications. However, in an embodiment, a rating could be applied based on whatever panel of tests to which that object is subjected. For example, on a scale of 1-100, with 100 being uncorrupted, an object that failed all of the tests might merit a "10". An object that passed all tests might rate a 90 or higher. The service appliance would keep a history of these ratings, and do a rolling look-back across them. Numerous low ratings across an hour, day, week, or similar interval would indicate a high probability of corruption on the production server. By acting on this evaluation, the service appliance can express its suspicions to a human administrator; and, depending on a slider bar setting, it could elect to terminate replication between the service appliance and the production server.

In a further embodiment, the service appliance maintains a cache containing the last few replications of an object, perhaps restricting entries in the cache to those objects that were at a high confidence level. In the event of detected corruption, the service appliance could offer to the administrator a roll-back of the corrupted objects to some prior point in time.

Additionally, there is the problem of insuring that objects safely committed to the service appliance service application database remain uncorrupted inside that database (e.g. the Jet DB used by Exchange), as opposed to ensuring that objects being replicated are not corrupted (per the above). For example, the overwhelming majority of failures of service application databases (e.g., the proprietary b-tree database that Microsoft uses for the Exchange mail object store) are in fact caused by administrator error (e.g., poor use of database optimization tools) and storage planning or driver errors. Since the service appliance is by definition immune to the former and crafted to be almost entirely immune to the latter, the large majority of service application corruption eventualities are not relevant for the service appliance.

Additionally, because the service appliance can maintain a hash of meta-data, body data, and total data for all individual objects which the service appliance replicates or otherwise commits to its store (as discussed above), an embodiment of the service appliance checks these hashes against on-the-fly hashes for a random sample of objects retrieved from the service appliance's store during the normal course of operations. A certain number of comparison failures would indicate corruption in the service appliance's own store, and the service appliance could take action, including alerting the administrator and running a full diagnostic. The service appliance would be able to determine to some reasonable degree the extent of corruption and either i) purge and resynchronize the corrupt objects only or ii) purge the entire service application database (e.g. Microsoft Exchange's Jet DB) and resynchronize the entire set of service data.

In still a further embodiment, the service appliance includes a "hidden" object store, for example constrained to objects updated within thirty days or some other period, in a version of the service application database file (e.g. the Exchange EDB) not accessible to the service appliance's primary file system itself (e.g. NTFS) and only accessible to the service appliance's supervisory kernel. In essence, the service appliance would be maintaining an abbreviated mirror of the primary service application, created with separate write transactions (so corruption would not propagate.) In a further embodiment, the service appliance could even cross-check objects from the hidden store against the primary store to be extra-safe.

Further embodiments can be envisioned to one of ordinary skill in the art after reading the attached documents. For example, although the above description of the invention focused on an example implementation of an electronic mail, calendaring, and collaboration service application, the invention is applicable for the implementation of any type of service application. In particular, electronic mail, calendaring, and collaboration service applications often include a database for storage and retrieval of such service applications' data. As such, an electronic mail, calendaring, and collaboration service application can be seen as a specific type of database application. Database applications are applications built around the use of a database, including merely providing database functionality in absence of other application features. One of ordinary skill in the art can easily appreciate that the invention can be used to implement any type of database application, with the example of an electronic mail, calendaring, and collaboration service application being merely a specific case of a more general principal. Moreover, the term database is used here in the sense of any electronic repository of data which provides some mechanism for the entry and retrieval of data, including but not limited to relational databases, object databases, file systems, and other data storage mechanisms.

In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of ensuring service availability, the method comprising:
connecting a service appliance to a network including a first production server providing a first service and a client system accessing the service, such that network traffic between the first production server and the client system is received by the service appliance;
synchronizing a second service provided by the service appliance with the first service;
monitoring the first service; and
in response to a determination that the production server is unavailable, substituting the second service in place of the first service and monitoring the network for a third service;
in response to a determination that the third service is available and capable of handling access by the client system, synchronizing the third service with the second service; and
in response to the completion of synchronization of the third service with the second service, substituting the third service in place of the second service, such that the third service is responsive to client system communications directed to the first service.

2. The method of claim 1, wherein the third service is provided by a second production server.

3. The method of claim 1, wherein the third service is provided by the first production server following an interruption of the first service.

4. The method of claim 1, further comprising:
in response to the completion of synchronization of the second service with the first service, monitoring the first service and, in response to a determination that the first service is unresponsive to client system communications, automatically substituting the second service in place of the first service.

5. The method of claim 1, wherein substituting the second service in place of the first service further comprises:
receiving network traffic directed to the first production server;
determining if the network traffic includes a service access; and
in response to the network traffic including the service access, selectively providing the network traffic to the second service, such that the second service responds to the service access.

6. The method of claim 1, wherein synchronizing the second service with the first service comprises:
determining a configuration of the first service;
configuring the second service to be compatible with the configuration; and
replicating service data of the first service.

7. The method of claim 6, wherein replicating service data comprises:
(a) initiating a first data transfer of the service data from the production server to the service appliance at a first time, wherein the first data transfer is adapted to copy the service data created by the production server prior to the first time;
(b) upon completion of the first data transfer, initiating an additional data transfer of the service data from the production server at a subsequent time, wherein the second data transfer is adapted to copy the service data created by the production server between the first time and the subsequent time;
(c) repeating (b) a predetermined number of times.

8. The method of claim 6, further comprising:
(d) upon completion of (a), (b), and (c), initiating a wait state of the service appliance;
(e) during the wait state of the service appliance, initiating a further data transfer of the service data from the production server to the service appliance following a time interval, wherein the further data transfers are adapted to copy the service data created by the production server during the time interval.

9. The method of claim 6, further comprising:
continually receiving network traffic directed to the production server;
caching at least a portion of the network traffic directed to the production server; and
upon completion of (a), (b), and (c), initiating a wait state of the service appliance;
during the wait state of the service appliance, providing at least the cached network traffic to the second service; and
during the wait state of the service appliance, providing at least a portion of the cached network traffic to the production server, enabling the first service to respond to the network traffic.

10. The method of claim 6, wherein replicating service data comprises:
(a) initiating a first data transfer of the service data from the production server to the service appliance at a first time, wherein the first data transfer is adapted to copy the service data created by the production server prior to the first time;
(b) upon completion of the first data transfer, initiating an additional data transfer of the service data from the production server at a subsequent time, wherein the second data transfer is adapted to copy the service data created by the production server between the first time and the subsequent time;
(c) determining if the production server created additional service data following a previous data transfer; and
(d) in response to a determination that the production server has created additional service data following a previous data transfer, repeating (b), (c) and (d) for at least one additional data transfer.

11. The method of claim 10, further comprising:
(e) upon completion of (a), (b), (c), and (d), initiating a wait state of the service appliance;
(f) during the wait state of the service appliance, initiating a further data transfer of the service data from the production server to the service appliance following a time interval, wherein the further data transfers are adapted to copy the service data created by the production server during the time interval.

12. The method of claim 10, further comprising:
continually receiving network traffic directed to the production server;
caching at least a portion of the network traffic directed to the production server; and
upon completion of (a), (b), (c), and (d), initiating a wait state of the service appliance;
during the wait state of the service appliance, providing at least the cached network traffic to the second service; and
during the wait state of the service appliance, providing at least a portion of the cached network traffic to the production server, enabling the first service to respond to the network traffic.

13. The method of claim 2, wherein synchronizing the third service with the second service further comprises:
(a) initiating a first data transfer of the service data from the service appliance to the second production server at a first time, wherein the first data transfer is adapted to copy the service data stored by the service appliance prior to the first time;
(b) upon completion of the first data transfer, initiating an additional data transfer of the service data from the service appliance to the second production server at a subsequent time, wherein the second data transfer is adapted to copy the service data created by the service appliance between the first time and the subsequent time; and
(c) determining if the service appliance has created additional service data following a previous data transfer; and
(d) in response to a determination that the service appliance has created additional service data following a previous data transfer, repeating (b), (c) and (d) for at least one additional data transfer.

14. The method of claim 2, wherein the second production server is connected with the network such that network traffic between the second production server and the client system is received by the service appliance.

* * * * *